US012767409B2

(12) United States Patent
(10) Patent No.: US 12,767,409 B2
(45) Date of Patent: Oct. 20, 2026

Morioka et al.

(54) DOUBLE CONTAINER

(71) Applicant: KYORAKU CO., LTD., Kyoto (JP)

(72) Inventors: Shun Morioka, Chuo-ku (JP); Shinsuke Taruno, Yamato (JP); Yosuke Muroya, Yamato (JP); Takaya Niimi, Yamato (JP); Tetsuaki Eguchi, Yamato (JP); Yuhi Kurahashi, Yamato (JP); Ippei Ohmura, Yamato (JP); Yuichiro Takahama, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 0 days.

(21) Appl. No.: 18/697,599

(22) PCT Filed: Sep. 29, 2022

(86) PCT No.: PCT/JP2022/036567

§ 371 (c)(1),
(2) Date: Apr. 1, 2024

(87) PCT Pub. No.: WO2023/058562

PCT Pub. Date: Apr. 13, 2023

(65) Prior Publication Data

US 2024/0400282 A1 Dec. 5, 2024

(30) Foreign Application Priority Data

Oct. 5, 2021 (JP) ................................ 2021-164253
Nov. 9, 2021 (JP) ................................ 2021-182599

(Continued)

(51) Int. Cl.

*B65D 77/06* (2006.01)
*B29B 17/02* (2006.01)

(Continued)

(52) U.S. Cl.

CPC .............. *B65D 77/06* (2013.01); *B29B 17/02* (2013.01); *B65D 23/02* (2013.01); *B65D 41/04* (2013.01);

(Continued)

(58) Field of Classification Search

CPC ........ B65D 77/06; B65D 23/02; B65D 41/04; B65D 1/0215; B65D 3/22; B65D 7/22; B65D 25/14

(Continued)

(56) References Cited

U.S. PATENT DOCUMENTS

2010/0044393 A1 2/2010 Moretti
2010/0264166 A1 10/2010 Moretti (Continued)

FOREIGN PATENT DOCUMENTS

CN 101863343 A 10/2010
EP 2197589 B1 2/2011

(Continued)

OTHER PUBLICATIONS

Office Action issued on May 7, 2026, in corresponding Japanese Application No. 2021-182599, 10 pages.

(Continued)

*Primary Examiner* — Robert Poon
(74) *Attorney, Agent, or Firm* — Maier & Maier, PLLC

(57) ABSTRACT

The present invention aims to provide a double container in which an inner bag is easily pulled out from a container body. According to the present invention, provided is a double container, comprising a container body and a cap, wherein: the container body comprises an inner bag, and an outer shell arranged to cover the inner bag; the cap is attached to a mouth part of the container body; the cap comprises an inner cap, and an overcap; the inner cap is engaged with the inner bag in an axial direction; the overcap (Continued)

is screw-engaged with the inner cap; and the double container is configured such that the inner bag can be pulled out from the container body by pulling the overcap in the axial direction.

9 Claims, 27 Drawing Sheets

(30) Foreign Application Priority Data

| | | |
|---|---|---|
| Dec. 15, 2021 | (JP) | 2021-203389 |
| Dec. 15, 2021 | (JP) | 2021-203391 |
| Mar. 2, 2022 | (JP) | 2022-032106 |
| Sep. 5, 2022 | (JP) | 2022-140782 |

(51) Int. Cl.

| | |
|---|---|
| ***B65D 23/02*** | (2006.01) |
| ***B65D 41/04*** | (2006.01) |
| *B29C 49/08* | (2006.01) |
| *B29C 49/22* | (2006.01) |
| *B29K 23/00* | (2006.01) |
| *B29K 67/00* | (2006.01) |
| *B29K 77/00* | (2006.01) |
| *B29K 105/16* | (2006.01) |
| *B29K 511/12* | (2006.01) |

(52) U.S. Cl.

CPC ....... *B29B 2017/0203* (2013.01); *B29C 49/08* (2013.01); *B29C 49/22* (2013.01); *B29K 2023/086* (2013.01); *B29K 2023/12* (2013.01); *B29K 2067/003* (2013.01); *B29K 2077/00* (2013.01); *B29K 2105/16* (2013.01); *B29K 2511/12* (2013.01); *B29K 2995/0053* (2013.01); *B29K 2995/0068* (2013.01); *B29K 2995/0082* (2013.01); *Y02W 30/80* (2015.05)

(58) Field of Classification Search

USPC ........ 220/495.08

See application file for complete search history.

(56) References Cited

U.S. PATENT DOCUMENTS

| | | | | |
|---|---|---|---|---|
| 2014/0252032 A1* | 9/2014 | Corbett | B65D 11/06 222/105 |
| 2016/0184849 A1 | 6/2016 | Moretti | |
| 2016/0184850 A1 | 6/2016 | Moretti | |
| 2016/0221728 A1 | 8/2016 | Taruno | |
| 2018/0265241 A1 | 9/2018 | Taruno et al. | |
| 2018/0312290 A1 | 11/2018 | Uchihashi et al. | |
| 2019/0118991 A1 | 4/2019 | Takayama et al. | |
| 2021/0368966 A1* | 12/2021 | Bickford | A45D 40/0068 |

FOREIGN PATENT DOCUMENTS

| | | | |
|---|---|---|---|
| EP | 3037174 | A1 | 6/2016 |
| JP | S61030633 | U | 2/1986 |
| JP | H08133322 | A | 5/1996 |
| JP | 3126191 | U | 10/2006 |
| JP | 3127378 | U | 11/2006 |
| JP | 2007062782 | A | 3/2007 |
| JP | 2010029286 | A | 2/2010 |
| JP | 2010195484 | A | 9/2010 |
| JP | 2012071882 | A | 4/2012 |
| JP | 2015067290 | A | 4/2015 |
| JP | 2015163520 | A | 9/2015 |
| JP | 2016210181 | A | 12/2016 |
| JP | 2017019562 | A | 1/2017 |
| JP | 2017171384 | A | 9/2017 |
| JP | 2018052619 | A | 4/2018 |
| JP | 2018087036 | A | 6/2018 |
| JP | 2018138477 | A | 9/2018 |
| JP | 201910741 | A | 1/2019 |
| JP | 2019163094 | A | 9/2019 |
| JP | 2020019522 | A | 2/2020 |
| JP | 2020193007 | A | 12/2020 |
| WO | 2016092721 | A1 | 6/2016 |

OTHER PUBLICATIONS

Extended Search Report issued on Jan. 16, 2025, in corresponding European Application No. 22878431.0, 8 pages.

International Search Report issued on Dec. 20, 2022, in corresponding International Application No. PCT/JP2022/036567; 10 pages.

Office Action issued on Mar. 3, 2026, in corresponding Japanese Application No. 2022-032106; 8 pages.

Office Action issued on Nov. 4, 2025 in corresponding Japanese patent application No. 2022-032106, 8 pages.

Office Action issued on Dec. 2, 2025 in corresponding Japanese Application No. 2021-182599, 8 pages.

Office Action issued on Dec. 23, 2025 in corresponding Japanese Application No. 2021-203389, 6 pages.

Office Action issued on Dec. 23, 2025 in corresponding Japanese Application No. 2021-203391, 8 pages.

Office Action issued on Jun. 24, 2026, in corresponding Chinese Application No. 202280066691.8, 14 pages.

* cited by examiner

DOUBLE CONTAINER

TECHNICAL FIELD

The present invention relates to a double container.

BACKGROUND ART

Conventionally, a double container that comprises a container body having an outer shell and an inner bag has been known. For example, it is disclosed in Patent Literature 1 that a double container formed by biaxially stretching blow molding with an outer shell preform and an inner bag preform overlapped.

CITATION LIST

Patent Literature

[Patent Literature 1] JP-A-2019-10741

SUMMARY OF INVENTION

Technical Problem (First, Third to Fifth, Seventh Perspectives)

Incidentally, when the outer shell and the inner bag of such a double container are formed of different materials, or when a content adheres to the inner bag after use, etc., it is desirable to separate the outer shell and the inner bag when recycling the double container.

The outer shell and inner bag are supposed to be separated by pulling out the inner bag from the container body, and it is desired to make it easier to pull out the inner bag from the container body.

The present invention has been made by taking these circumstances into consideration, and aims to provide a double container in which the inner bag is easily pulled out from the container body.

(Second Perspective)

Incidentally, in such a double container, after biaxial stretch blow molding and before filling the content, the inner bag may shrink, reducing the capacity of the inner bag. Since tt is possible to assume that the entire inner bag shrinks such that it deflates, any particular problems are unlikely to be caused. However, the inner bag may be folded inward during shrinkage, forming an internally bending part that projects from the inner surface of the inner bag. The internally bending part is likely to be formed first at the lower end of the shoulder part of the container body, where the blow ratio is relatively large. When the internally bending part is formed at the lower end of the shoulder part, the internally bending part is extended toward the body part body of the container body, resulting in the formation of the internally bending part over a wide area of the body part body. When the internally bending part is formed, the diameter of the inner bag is reduced by the amount of the internally bending part in that part. Therefore, when the internally bending part is formed over a wide area of the body part body, the degree of capacity reduction of the inner bag increases.

The present invention has been made by taking these circumstances into consideration, and aims to provide a double container that can suppress formation of an internally bending part over a wide area of a body part body.

(Sixth Perspective)

Incidentally, when the outer shell and the inner bag of such a double container are formed of different materials, or when a content adheres to the inner bag after use, etc., it is desirable to separate the outer shell and the inner bag when recycling the double container.

The outer shell and the inner bag can be separated by the user pulling out the inner bag from the container body, but some users find such work troublesome, and it is not easy to motivate them to pull out the inner bag.

The present invention has been made by taking these circumstances into consideration, and aims to provide a double container that can motivate the user to pull out the inner bag.

Solution to Problem

According to the first perspective, the following inventions are provided:

[1] A double container, comprising a container body and a cap, wherein: the container body comprises an inner bag, and an outer shell arranged to cover the inner bag; the cap is attached to a mouth part of the container body; the cap comprises an inner cap, and an overcap; the inner cap is engaged with the inner bag in an axial direction; the overcap is screw-engaged with the inner cap; and the double container is configured such that the inner bag can be pulled out from the container body by pulling the overcap in the axial direction.

[2] The double container of [1], wherein the overcap comprises a hooking part allowing a user to hook a finger on the overcap when pulling the overcap.

[3] The double container of [2], wherein the hooking part is a projecting part which is provided on an outer periphery of the overcap and projects radially outward from the overcap.

[4] The double container of [3], wherein the projecting part is provided in a part of a circumferential direction of the overcap.

[5] The double container of any one of [1] to [4], wherein: the inner cap comprises a body part and a band part; the body part and the band part are connected to each other via an easily tearable connecting part; the band part is engaged with a mouth part of the outer shell in the axial direction; the body part is engaged with a mouth part of the inner bag in the axial direction; and the band part is configured to be separable from the body part by tearing the connecting part.

In the double container of the present perspective, since the overcap is screw-engaged to the inner cap, the overcap will not come off the inner cap even if the overcap is pulled. For this reason, it is possible to pull out the inner bag from the container body by pulling the overcap, thus easily pulling out the inner bag from the container body.

According to the second perspective, the following inventions are provided:

[1] A double container, comprising a container body having an inner bag and an outer shell, wherein: the container body comprises a mouth part, a body part, and a bottom part; the mouth part is a tubular part having an opening end; the body part is arranged adjacent to the mouth part on a side farther from the opening end than the mouth part; the body part has a larger outer diameter than the mouth part; the bottom part is configured to close a lower end of the body part; the body part has a shoulder part whose outer diameter increases as a distance from the mouth part increases, and a body part body which is a part closer to the bottom part than the shoulder part; the body part body has an annular groove rib; and the annular groove rib is provided at a position of 0.80H to 0.99H from a ground surface of the container body, where H is a height from the ground surface of the container body to a lower end of the shoulder part.

[2] The double container of [1], wherein the container body is a product molded by biaxially stretch blow molding.

[3] The double container of [1] or [2], wherein D5/D4 is 1.3 or more, where D5 is an outer diameter at a lower end of the shoulder part and D4 is an outer diameter at a root of the mouth part of the outer shell.

[4] The double container of any one of [1] to [3], wherein an inclination angle of the shoulder part with respect to the ground surface is 60 degrees or less.

[5] The double container of any one of [1] to [4], wherein the body part body has a constricted shape such that a diameter of the body part body is minimum at a position of 0.20H to 0.70H.

In the double container of the present perspective, an annular groove rib is provided adjacent to the shoulder part in the body part body. If the internally bending part is extended over a wide area of the body part body, the capacity of the inner bag is noticeably reduced. However, in the present invention, the extension of the internally bending part is stopped by the annular groove rib provided at the above-mentioned position. For this reason, it is possible to suppress the formation of the internally bending part over a wide area of the body part body.

According to the third to fifth perspectives, the following inventions are provided:

[1] (Third perspective) A double container, comprising an inner bag and an outer shell, wherein a peak torque value when the inner bag is rotated 45 degrees relative to the outer shell is 140 cN·m or less.

In the double container of the present perspective, the peak torque value is 140 cN·m or less when the inner bag is rotated 45 degrees relative to the outer shell. This peak torque value is an indicator showing the strength of the fitting between the inner bag and the outer shell at the mouth part of the container body. The larger the value, the stronger the fitting between the inner bag and the outer shell, and the harder it is to pull out the inner bag from the container body. In the double container of the present invention, since the peak torque value is as small as 140 cN·m or less, the inner bag can be easily pulled out from the container body.

[2] The double container of [1], wherein:
the inner bag comprises a projecting part projecting from an opening end of the outer shell; and a length of the projecting part is 10 mm or longer.

[3] The double container of [2], wherein an uneven shape is provided on an outer surface or an inner surface of the projecting part.

[4] The double container of any one of Claims [1] to [3], wherein: the double container further comprises a mouth part attachment member attachable to a mouth part of the container body; the mouth part attachment member comprises an inner cap and an overcap; the inner cap comprises a body part and a band part; the body part and the band part are connected to each other via an easily tearable connecting part; the body part comprises a discharge port; the band part is engaged with a mouth part of the outer shell in an axial direction; the band part is configured to be separable from the body part by tearing the connecting part; and the overcap is configured to be attachable to or detachable from the body part and to be able to close the discharge port when attached to the body part.

[5] (Fourth perspective) A method for pulling out an inner bag, comprising an inner bag pulling-out step, wherein: in the inner bag pulling-out step, pulling out of the inner bag from a container body having the inner bag and an outer shell is performed; and the pulling out is performed while twisting the inner bag or after twisting the inner bag.

[6] The method of [5], wherein: the inner bag comprises a mouth part, a body part, and a bottom part; the mouth part is a tubular part having an opening end; the body part is arranged adjacent to the mouth part on a side farther from the opening end than the mouth part; the body part has a larger outer diameter than the mouth part; the bottom part is configured to close a lower end of the body part; and the inner bag is twisted by rotating the mouth part relative to the outer shell.

[7] The method of [6], wherein: the body part has a shoulder part whose outer diameter increases as a distance from the mouth part increases; and the inner bag is twisted at least at the shoulder part.

[8] The method of any one of [5] to [7], wherein the inner bag comprises a mouth part and a bottom part, and a rotation angle of the mouth part with respect to the bottom part when twisting the inner bag is 30 degrees or more.

[9] (Fifth perspective) A method for pulling out an inner bag, comprising an inner bag pulling-out step, wherein: in the inner bag pulling-out step, the inner bag is pulled out from the container body having the inner bag and an outer shell; the inner bag comprises an engaging part at a mouth part; and a mouth part attachment member can be attached to the engaging part.

[10] The method of [9], wherein: the inner bag comprises a flange at a position farther from an opening end of the mouth part than the engaging part; and an opening end of the outer shell is arranged farther from the opening end of the inner bag than the flange.

According to the sixth perspective, the following inventions are provided:

[1] A double container, comprising a container body having an inner bag and an outer shell, wherein: the container body comprises a mouth part, a body part, and a bottom part; the mouth part is a tubular part having an opening end; the body part is arranged adjacent to the mouth part on a side farther from the opening end than the mouth part; the body part has a larger outer diameter than the mouth part; the bottom part is configured to close a lower end of the body part; an outside air introduction hole is not provided at a part closer to the bottom part than a root of the mouth part; and the inner bag is configured to be able to be pulled out from the container body.

[2] The double container of [1], wherein: a bottom part concave region is provided in the bottom part; the bottom part concave region is a region in which the bottom part is concave toward an inside of the container body; and D6/D2 is 0.70 to 1.20, where D2 is an inner diameter of a mouth part of the outer shell and D6 is a diameter of an edge of the bottom part concave region.

[3] The double container of [2], wherein D6/D2 is 0.85 to 1.00.

[4] The double container of [2] or [3], wherein an inclination angle of a peripheral surface of the bottom part concave region with respect to a ground surface of the container body is 30 to 70 degrees.

[5] The double container of any one of [1] to [4], wherein D2 is 25 to 40 mm.

In the double container of the present perspective, an outside air introduction hole is not provided at the part closer to the bottom part than the root of the mouth part. For this reason, when the inner bag is pulled out from the container body, the inside of the outer shell is in a closed state when the inner bag blocks the root of the mouth part of the outer shell. If the inner bag is pulled out from this state by applying more force to the inner bag, a pleasant "pop" sound is generated when the inner bag is pulled out. The generation of such a sound may motivate the user to pull out the inner bag to enjoy the sound, or it may motivate the user to pull out the inner bag on the next occasion as well because it is easy to remember that the inner bag was pulled out.

According to the seventh perspective, the following inventions are provided:

[1] A double container, comprising a container body, wherein: the container body comprises an inner bag, and an outer shell arranged to cover the inner bag; the inner bag is configured to be able to be pulled out from the container body; and an innermost layer of the inner bag is configured of a water-absorbent softening resin having a property of softening by water absorption.

[2] The double container of [1], wherein the water-absorbent softening resin is EVOH or nylon.

[3] The double container of [1] or [2], wherein the double container is an inverted container having a cap with an enlarged top surface diameter.

In the double container of the present perspective, the innermost layer of the inner bag is configured of a water-absorbent softening resin. Therefore, the force required to pull out the inner bag from the container body can be reduced by wetting the innermost layer of the inner bag before pulling out the inner bag from the container body.

BRIEF DESCRIPTION OF DRAWINGS

FIG. 10A is a perspective view, and FIG. 10B is an exploded perspective view of FIG. 10A.

DESCRIPTION OF EMBODIMENTS

Hereinafter, embodiments of the present invention will be described. Various distinctive features shown in the following embodiments can be combined with each other. In addition, the of the invention can be established independently for each distinctive features.

Hereinafter, the first to sixth embodiments of the present invention will be described. The first and second embodiments are mainly related to the first perspective. The third embodiment is mainly related to the second and sixth perspectives. The fourth embodiment is mainly related to the sixth perspective. The fifth embodiment is mainly related to the third and fourth perspectives. The sixth embodiment is mainly related to the fifth perspective. The seventh embodiment is mainly related to the seventh perspective. The contents described in the first to seventh embodiments are mutually applicable as long as they do not contradict the spirit thereof. The contents described in relation to the first to seventh embodiments are mutually applicable as long as they do not contradict the spirit thereof.

1. First Embodiment 1-1. Configuration of Double Container 1

<Basic Configuration>

Figure 1:
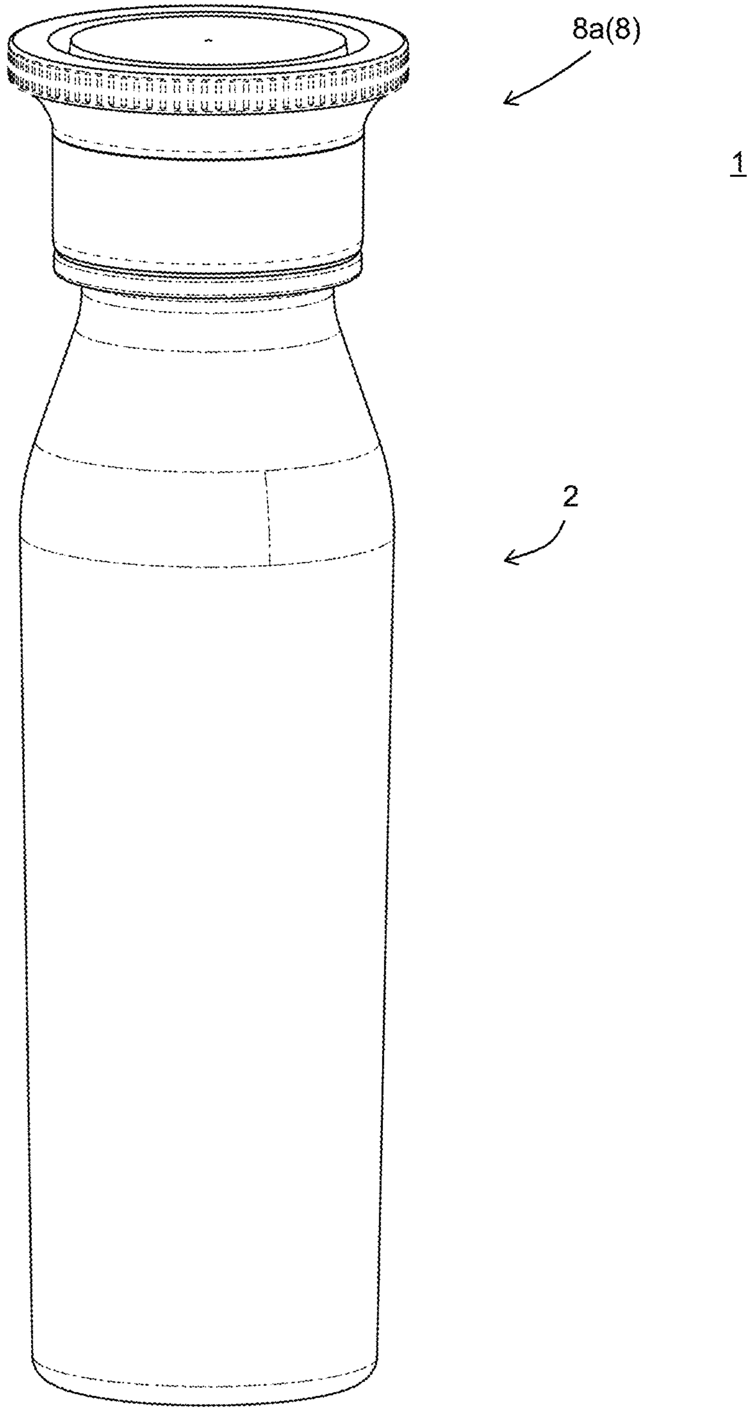
FIG. 1 is a perspective view of a double container 1 according to first and seventh embodiments of the present invention. The dashed line in the figure represents a boundary line where the curvature of the surface constituting the surface shape changes. The same is applied to other figures.

As shown in FIG. 1, a double container 1 of the first embodiment of the present invention has a container body 2 and a cap 8*a* which is a mouth part attachment member 8. In the following description, "mouth part attachment member 8" can be read as "cap 8*a*.

Figure 2:
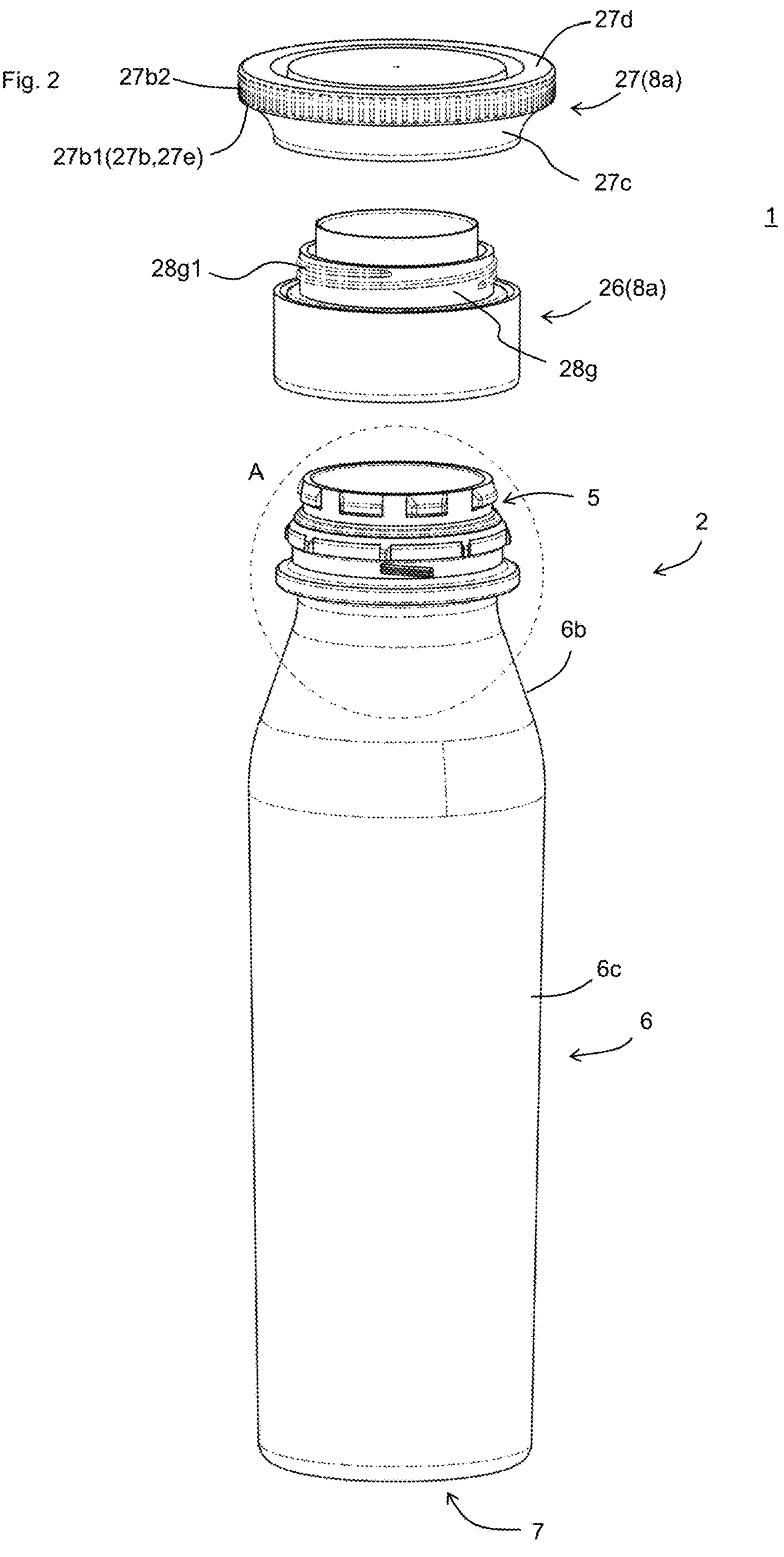
FIG. 2 is an exploded perspective view of FIG. 1.
Figure 3:
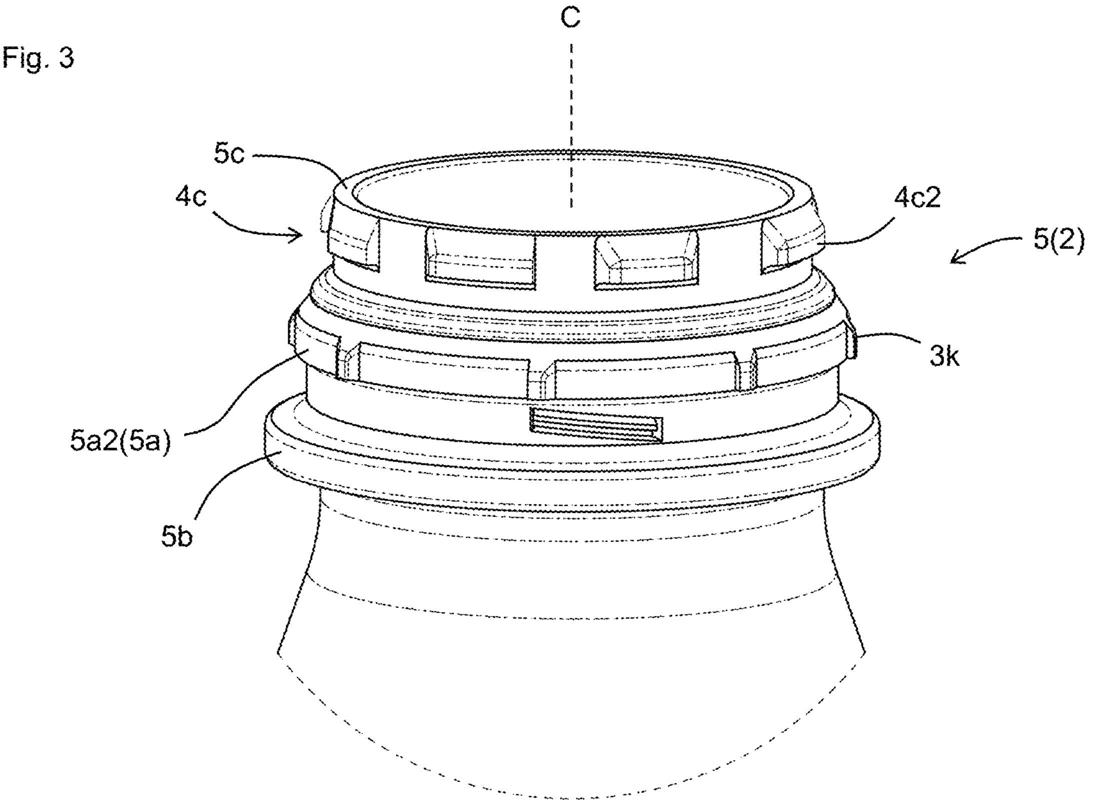
FIG. 3 is an enlarged view of an area A in FIG. 2.

As shown in FIGS. 2 to 3, the container body 2 has a mouth part 5, a body part 6, and a bottom part 7. The mouth part 5 is a tubular (preferably cylindrical) part having an opening end 5*c*. The mouth part 5 includes an engaging part 5*a* to which a mouth part attachment member 8 such as a cap or a pump can be attached. In the present embodiment, since the mouth part attachment member 8 is a press-fit type, the engaging part 5*a* is an annular convex part 5*a*2 that projects circumferentially. When the mouth part attachment member 8 is a screw type, the engaging part 5*a* is a male screw part. The mouth part attachment member 8 may or may not have a check valve (not shown). A flange 5*b* is provided in the mouth part 5. The flange 5*b* can be used to support the mouth part 5 when attaching the mouth part attachment member 8 to the mouth part 5.

The body part 6 is arranged adjacent to the mouth part 5 on a side farther from the opening end 5*c* than the mouth part 5. The body part 6 has a larger outer diameter than the mouth part 5 (in the present specification, the "outer diameter" means the diameter of a circumscribed circle when the cross section is not circular). The body part 6 is tubular, and the bottom part 7 is provided at a lower end of the body part 6 to close the lower end of the body part 6. The body part 6 has a shoulder part 6*b* whose outer diameter increases as a distance from the mouth part 5 increases. Further, the body part 6 includes a body part body 6*c* on the side of the bottom part 7 rather than the shoulder part 6*b*. The body part body 6*c* has, for example, a shape in which the outer diameter is substantially constant toward the bottom part 7, or a shape in which the outer diameter decreases toward the bottom part 7.

Figure 4:
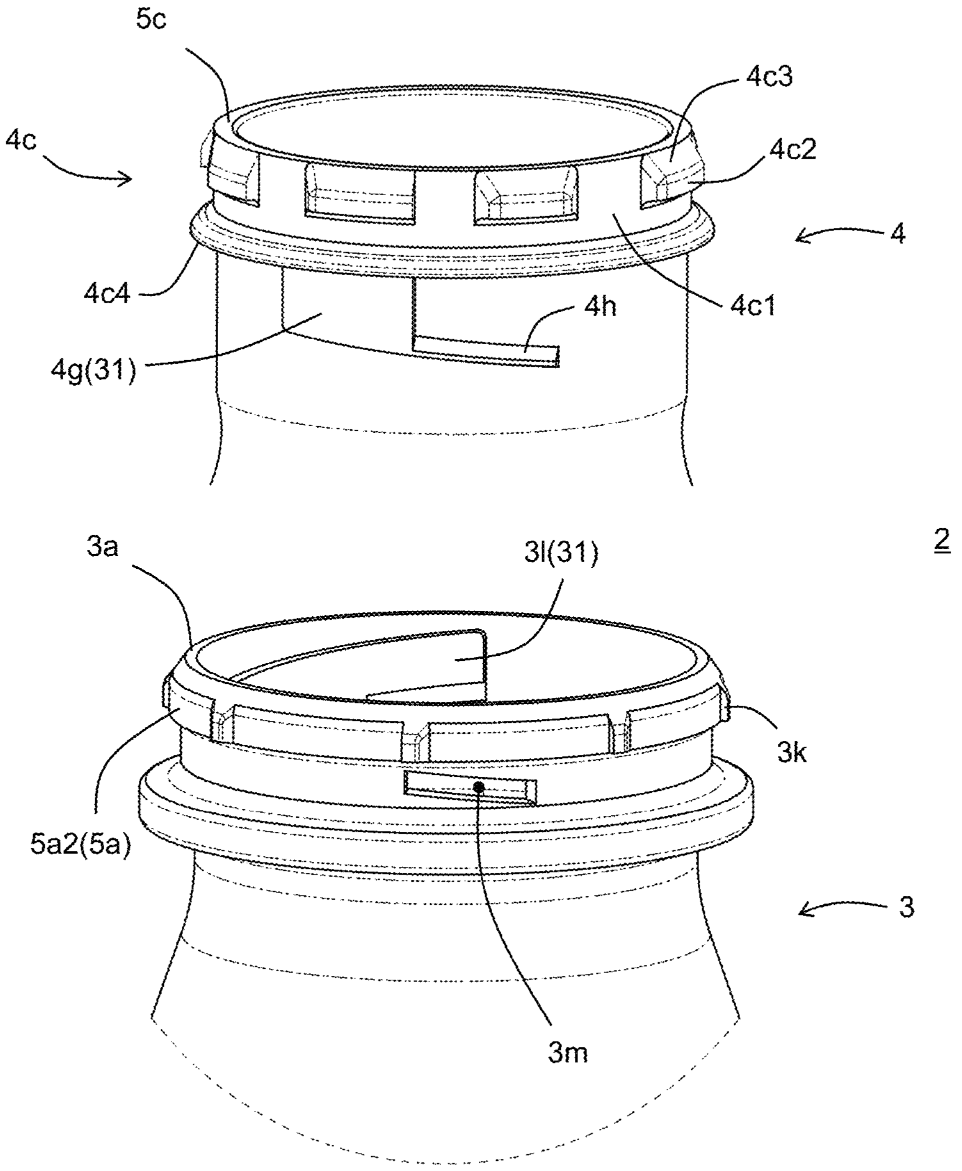
FIG. 4 is an exploded perspective view of FIG. 3. Only a part of the inner bag 4 in a vicinity of the opening end 5*c* is shown in the figure.

As shown in FIG. 4, the container body 2 includes an inner bag 4, and an outer shell 3 arranged to cover the inner bag 4. The inner bag 4 is accommodated in the outer shell 3 except for the projecting part 4*c*. In the following description, the parts of the inner bag 4 corresponding to the mouth part 5, the body part 6, and the bottom part 7 of the container body 2 are referred to as the mouth part 5, the body part 6, and the bottom part 7 of the inner bag 4, respectively. The same is applied to the outer shell 3.

The thickness of the outer shell 3 at the center in the height direction of the container body 2 is, for example, 0.2 to 0.8 mm, and preferably 0.25 to 0.5 mm. This thickness is, specifically for example, 0.2, 0.25, 0.3, 0.4, 0.5, 0.6, 0.7, or 0.8 mm, and may be in the range between the two values exemplified herein. The thickness of the inner bag 4 at the center in the height direction of the container body 2 is, for example, 0.05 to 0.25 mm, and preferably 0.08 to 0.20 mm. This thickness is, specifically for example, 0.05, 0.08, 0.10, 0.15, 0.20, or 0.25 mm, and may be in the range between the two values exemplified herein.

When the check valve is not provided in the mouth part attachment member 8, the inner bag 4 does not shrink even after the content of the inner bag 4 is discharged. Therefore, it is not easy to pull out the inner bag 4 through the mouth part 5 of the outer shell 3. Since the present invention allows the inner bag 4 to be easily pulled out through the mouth part 5 of the outer shell 3, the significance of applying the present invention is particularly prominent when the check valve is not provided in the mouth part attachment member 8.

The inner diameter of the mouth part 5 of the outer shell 3 is, for example, 20 to 50 mm, and preferably 25 to 40 mm. The inner diameter of the mouth part 5 of the outer shell 3 is, specifically for example, 20, 25, 30, 35, 40, 45, or 50 mm, and may be in the range between the two values exemplified herein. The length of the mouth part 5 is, for example, 15 to 35 mm, specifically for example, 15, 20, 25, 30, or 35 mm, and may be in the range between the two values exemplified herein.

<Structure of Mouth Part Attachment Member 8, and Engagement Structure between Mouth Part Attachment Member 8 and Container Body 2>

The mouth part attachment member 8 is attached to the mouth part 5 of the container body 2. As shown in FIG. 2, the mouth part attachment member 8 has an inner cap 26 and an overcap 27. The inner cap 26 is engaged with inner bag 4 in an axial direction, and may or may not be engaged in a circumferential direction. The overcap 27 is screw-engaged to the inner cap 26, and the overcap 27 will not come off the inner cap 26 even if the overcap 27 is pulled in the axial direction. For this reason, the inner bag 4 can be pulled out from the container body 2 by pulling the overcap 27 in the axial direction. In the present specification, the "axial direction" is the direction in which the central axis C of the mouth part 5 extends, in other words, the direction in which the inner bag 4 is pulled out from the container body 2. The "circumferential direction" is the rotation direction around the central axis C of the mouth part 5. In other words, it is the direction in which the inner bag 4 is rotated relative to the outer shell 3 at the mouth part 5.

The screw engagement of the overcap 27 and the inner cap 26 is preferably a positive screw engagement (a screw engagement that tightens when the overcap 27 is rotated clockwise against the inner cap 26, as viewed from the side of the overcap 27).

The overcap 27 preferably has a hooking part 27*b* that allows the user to hook a finger on the overcap 27 when pulling the overcap 27. This configuration makes it possible to hook a finger on the hooking part 27*b* and apply force to the overcap 27 in the pulling-out direction, which further facilitates the pulling out of the inner bag 4. The hooking part 27*b* is preferably a projecting part 27*b*1 that is provided on the outer periphery of the overcap 27 and projects radially outward from the overcap 27. In the present embodiment, the projecting part 27*b*1 is provided around the entire circumference of the overcap 27. Preferably, an uneven shape 27*b*2 (eg, knurled) is provided on the outer peripheral surface of the projecting part 27*b*1. This makes the outer peripheral surface of the projecting part 27*b*1 less slippery when gripped, and makes it even easier to grasp the overcap 27 and rotate the mouth part attachment member 8.

The mouth part attachment member 8 is preferably configured such that the inner bag 4 rotates at the mouth part 5 as the mouth part attachment member 8 rotates (here, the rotation is relative to the outer shell 3). That is, the mouth part attachment member 8 is preferably engaged with the inner bag 4 in the circumferential direction. According to such a configuration, the inner bag 4 can be rotated at the mouth part 5 by rotating the mouth part attachment member 8. In the container body 2 of the present embodiment, by rotating the inner bag 4 relative to the outer shell 3, the inner bag 4 moves in the direction to be pulled out from the container body 2. Therefore, by rotating the mouth part attachment member 8, the inner bag 4 can be pushed up from the container body 2. Then, the inner bag 4 can be easily pulled out from the container body 2, by using the part where the inner bag 4 is pushed up from the container body 2 as a trigger.

Since the outer diameter of the body part 6 of the container body 2 is larger than that of the mouth part 5, it is not easy to pull out the inner bag 4 through the mouth part 5 of the outer shell 3 simply by pulling the inner bag 4. However, by rotating the mouth part 5 of the inner bag 4 and twisting the inner bag 4 to reduce the diameter of the body part 6 of the inner bag 4, the body part 6 of the inner bag 4 can easily pass through the mouth part 5 of the outer shell 3, and the inner bag 4 can be easily pulled out from the container body 2.

Hereinafter, the engagement structure between the mouth part attachment member 8 and the container body 2 will be described in more detail.

As shown in FIGS. 3 to 4, the inner bag 4 includes a projecting part 4*c* projecting from the opening end 3*a* of the outer shell 3. The projecting part 4*c* includes a projecting cylinder 4*cl*, an engagement convex part 4*c*2, and an abutting flange 4*c*4.

Figure 6A:
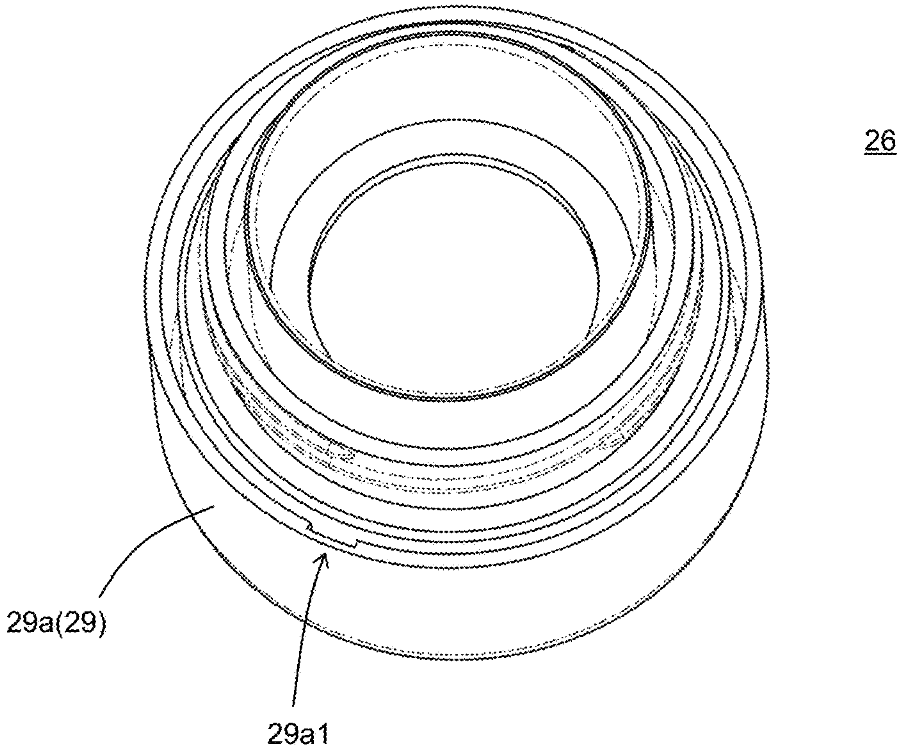
FIG. 6A is a perspective view of an inner cap 26 as viewed from above.
Figure 6B:
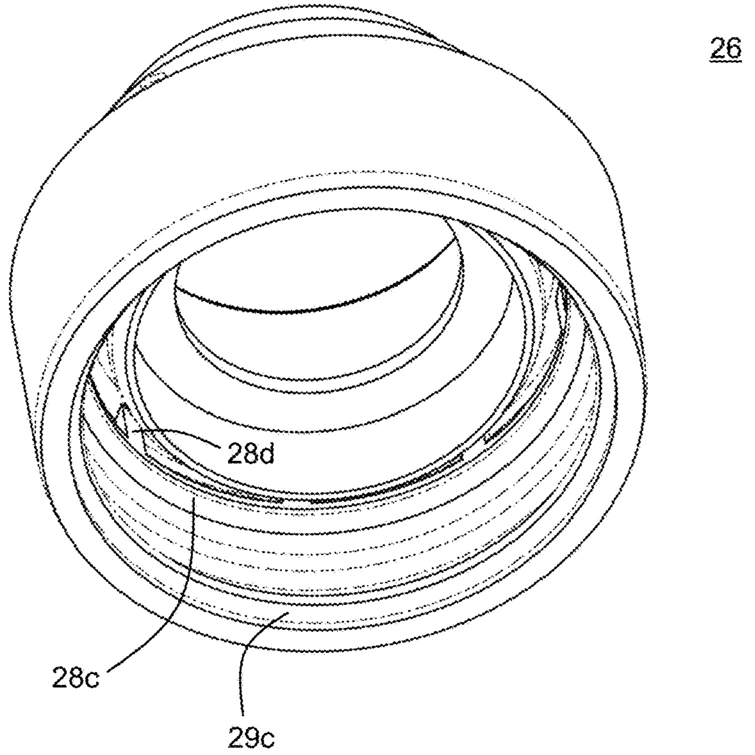
FIG. 6B is a perspective view of the inner cap 26 as viewed from below.

The engagement convex part 4*c*2 projects radially outward from the peripheral surface of the projecting cylinder 4*cl*. The engagement convex parts 4*c*2 are provided at a plurality of locations (8 locations in the present embodiment) spaced apart in circumferential direction. The engagement convex part 4*c*2 has a tapered surface 4*c*3 on its upper surface. This makes it easier for the annular convex part 28*c* (shown in FIGS. 6B and 7) of the mouth part attachment member 8 to climb over the engagement convex part 4*c*2, as described below.

The abutting flange 4*c*4 is an annular part disposed at a position abutting against the opening end 3*a* and having a diameter larger than that of the projecting cylinder 4*cl*. The inner bag 4 is prevented from falling out into the outer shell 3 by the abutment of the abutting flange 4*c*4 against the opening end 3*a*. On the other hand, the inner bag 4 may be avoided from falling out into the outer shell 3 by having the engagement convex part 4*c*2 abutting the opening end 3*a* without providing the abutting flange 4*c*4.

An annular convex part 5*a*2, and projections 3*k* intermittently provided on the annular convex part 5*a*2 are provided on the outer peripheral surface of the mouth part 5 of the outer shell 3. The projections 3*k* are provided at a plurality of locations (8 locations in the present embodiment) spaced apart in the circumferential direction on the annular convex part 5*a*2.

As shown in FIGS. 2, 6A to 6B, and 7, the mouth part attachment member 8 is a press-fit type, and the mouth part attachment member 8 can be attached to the mouth part 5 by applying axial force to the mouth part attachment member 8.

Figure 7:
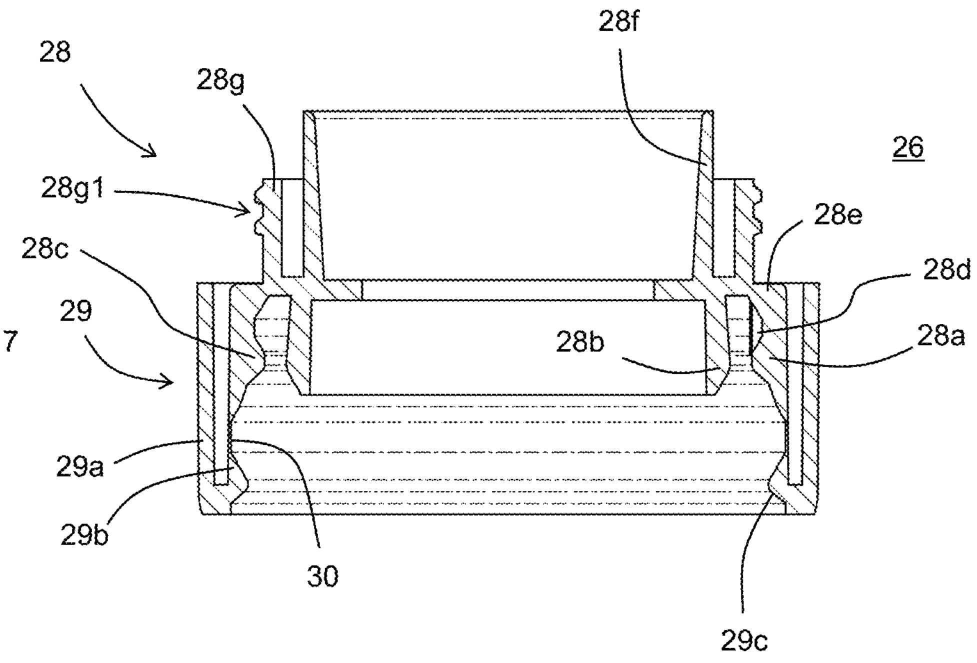
FIG. 7 is a longitudinal cross-sectional view through the center of the inner cap 26.

As shown in FIG. 7, the inner cap 26 has a body part 28 and a band part 29. The body part 28 and the band part 29 are connected to each other via an easily tearable connecting part 30.

The band part 29 engages the mouth part 5 of the outer shell 3 in the axial direction. Therefore, the band part 29 is restricted from moving in the axial direction with respect to the mouth part 5 of the outer shell 3. The band part 29 may or may not be engaged with the mouth part 5 of the outer shell 3 in the circumferential direction. When the band part 29 is engaged with the mouth part 5 of the outer shell 3 in the circumferential direction, the band part 29 is restricted from moving in the circumferential direction with respect to the mouth part 5 of the outer shell 3.

The body part 28 engages the mouth part 5 of the inner bag 4 in the axial direction. Therefore, the body part 28 is restricted from moving in the axial direction with respect to the mouth part 5 of the inner bag 4. The body part 28 may or may not engage the mouth part 5 of the inner bag 4 in the circumferential direction. When the body part 28 engages the mouth part 5 of the inner bag 4 in the circumferential direction, the body part 28 is restricted from moving in the circumferential direction with respect to the mouth part 5 of the inner bag 4.

The connecting part 30 is configured to be tearable by applying force (shearing force, rotational force, etc.) between the body part 28 and the band part 29. The connecting part 30 is preferably thinner than the body part 28 and the band part 29.

The band part 29 has an outer cylinder 29*a* and an inner cylinder 29*b*. The inner cylinder 29*b* is arranged inside the outer cylinder 29*a*. The outer cylinder 29*a* and the inner cylinder 29*b* are connected at the lower end of the band part 29, and the inner cylinder 29*b* is connected to the body part 28 via a connecting part 30. The inner cylinder 29*b* is arranged to surround the annular convex part 5*a*2. An engagement convex part 29*c* extending in the circumferential direction is provided on the inner peripheral surface of the inner cylinder 29*b*. The band part 29 is engaged with the mouth part 5 of the outer shell 3 in the axial direction by engaging the engagement convex part 29*c* with the annular convex part 5*a*2 in the axial direction. A tapered surface is provided on the lower side of the engagement convex part 29*c*, and the force required for the engagement convex part 29*c* to climb over the annular convex part 5*a*2 is reduced.

The projections 3*k* provided on the annular convex part 5*a*2 are pressed against the inner cap 26, thereby frictionally engaging the inner cap 26 with the mouth part 5 of the outer shell 3 in the circumferential direction. As described below, the double container 1 of the present embodiment is configured such that the mouth part attachment member 8 and the inner bag 4 rotate in unison, causing the inner bag 4 to move in the direction of slipping out from the container body 2, and the inner bag 4 may unintentionally slip out from the container body 2 if the mouth part attachment member 8 unintentionally rotates with respect to the outer shell 3. To prevent occurrence of such a problem, the inner cap 26 is engaged with the mouth part 5 of the outer shell 3 in the circumferential direction to suppress the mouth part attachment member 8 from rotating with respect to the mouth part 5 of the outer shell 3.

The outer cylinder 29*a* of the band part 29 has a thin part 29*al*. The band part 29 can be removed by tearing the connecting part 30 after initiating tearing at the thin part 29*al*.

The body part 28 has an outer cylinder 28*a*, an inner cylinder 28*b*, an annular convex part 28*c*, an engagement convex part 28*d*, a top plate 28*e*, a discharge cylinder 28*f*, and an attachment cylinder 28*g*.

The top plate 28*e* is provided on the upper surface of the outer cylinder 28*a*. The inner cylinder 28*b* is provided on the lower surface of the top plate 28*e*. The inner cylinder 28*b* is a so-called inner ring, which is smaller in diameter than the outer cylinder 28*a* and is arranged inside the outer cylinder 28*a*. The discharge cylinder 28*f* and the attachment cylinder 28*g* are provided on the upper surface of the top plate 28*e*. The content of the inner bag 4 is discharged through the discharge cylinder 28*f*. As shown in FIG. 2, the outer peripheral surface of the attachment cylinder 28*g* is provided with a male screw part 28*g*1, and the overcap 27 is screw-engaged with the inner cap 26 by engaging the male screw part 28*g*1 with the female screw part provided on the inner peripheral surface of the cylinder part 27*c* of the overcap 27.

In this case, the overcap 27 can be attached to and detached from the inner cap 26 by rotating the overcap 27 relative to the inner cap 26.

The annular convex part 28*c* is an annular convex part provided on the inner peripheral surface of the outer cylinder 28*a* so as to extend in the circumferential direction. The annular convex part 28*c* engages with the engagement convex part 4*c*2 in the axial direction, thereby engaging the body part 28 with the mouth part 5 of the inner bag 4 in the axial direction. The engagement convex parts 28*d* are spaced apart and provided at a plurality of locations (8 locations in the present embodiment) in the circumferential direction. The engagement convex part 28*d* is arranged between adjacent engagement convex parts 4*c*2, thereby engaging the body part 28 with the mouth part 5 of the inner bag 4 in the circumferential direction.

<Engagement Structure Between Outer Shell 3 and Inner Bag 4>

As shown in FIG. 4, a cam convex part 4*g* and an engagement convex part 4*h* are provided on the outer peripheral surface of the inner bag 4. The cam convex part 4*g* and the engagement convex part 4*h* are connected to each other. The lower surfaces of the cam convex part 4*g* and the engagement convex part 4*h* are respectively inclined so as to approach the opening end 5*c* as they move clockwise when viewed from the side of opening end 5*c* of the mouth part 5.

Figure 5:
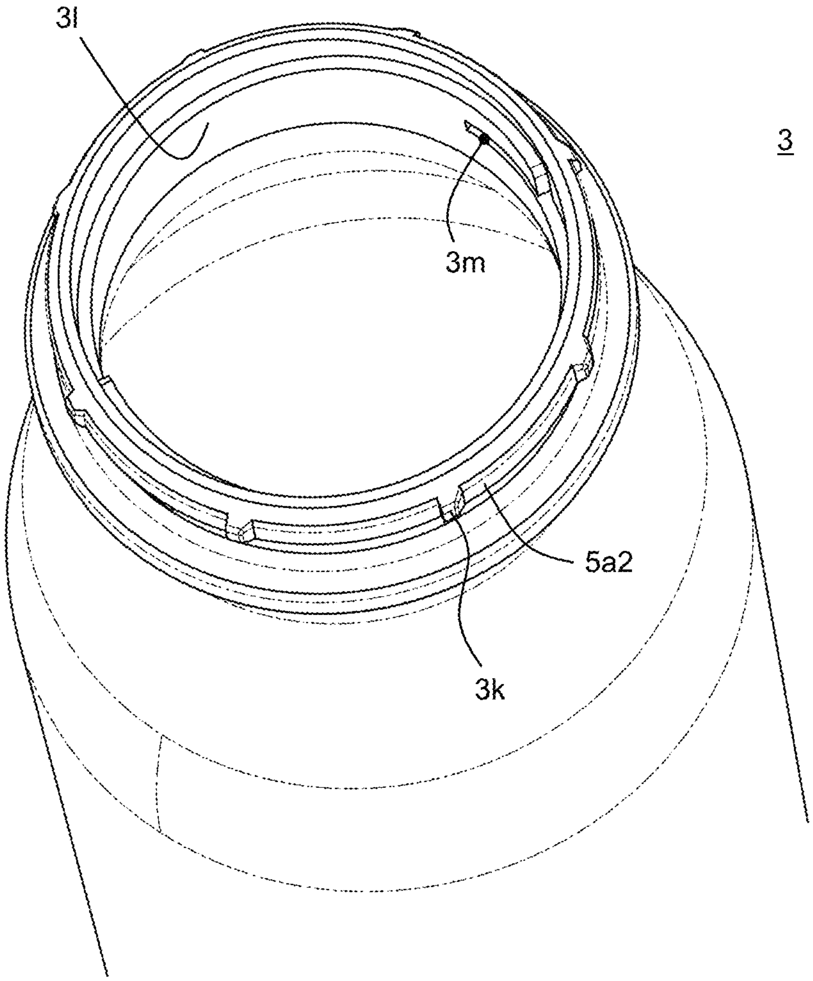
FIG. 5 is a perspective view of a vicinity of an opening end of an outer shell 3.

As shown in FIG. 5, a cam rail 3*l* and an engagement concave part 3*m* are provided on the inner peripheral surface of the outer shell 3. The engagement concave part 3*m* is provided such that the lower surface of the engagement concave part 3*m* is continuous with the upper surface of the cam rail 3*l*. The upper surface of the cam rail 3*l* and the lower surface of the engagement concave part 3*m* are inclined so as to approach the opening end 3*a* as they move clockwise when viewed from the side of opening end 3*a*. In the state before pulling out the inner bag 4 from the container body 2, the engagement convex part 4*h* is arranged in the engagement concave part 3*m*, and the lower surface of the cam convex part 4*g* abuts on the upper surface of the cam rail 3*l*. The cam mechanism 31 is configured by the cam convex part 4*g* and the cam rail 3*l*. In the present embodiment, the engagement concave part 3*m* is a through hole. However, it may be a non-through hole.

<Method for Pulling Out Inner Bag 4>

In the state before starting to pull out the inner bag 4, the body part 28 of the mouth part attachment member 8 and the band part 29 are connected, and the band part 29 is engaged with the mouth part 5 of the outer shell 3 in the axial direction. Therefore, in this state, the inner bag 4 cannot be pulled out from the container body 2. For this reason, first, the band part 29 is removed by tearing the connecting part 30. As a result, the engagement between the mouth part attachment member 8 and the mouth part 5 of the outer shell 3 is released, and pulling out the inner bag 4 is made possible.

Next, the mouth part attachment member 8 is rotated clockwise as viewed from the open end 5*c*. Since the inner bag 4 is engaged with the mouth part attachment member 8 in the circumferential direction, the inner bag 4 rotates in the same direction as the mouth part attachment member 8 rotates, and the cam convex part 4*g* moves along the cam rail 3*l*. Along with this movement, the inner bag 4 moves in the direction of slipping out from the container body 2. At this time, the inner bag 4 is twisted and the diameter of the body part 6 of the inner bag 4 is reduced. When attempting to rotate the inner bag 4 counterclockwise as viewed from the opening end 5*c*, the cam convex part 4*g* of the inner bag 4 interferes with the convex part configuring the cam rail 3*l*, making it impossible to rotate the inner bag 4. Therefore, it is possible to prevent the inner bag 4 from being rotated in the wrong direction.

The mouth part attachment member 8 can be rotated by grasping the overcap 27. Loosening of the screw engagement of the overcap 27 and the inner cap 26 can be avoided by the positive screw engagement of the overcap 27 and the inner cap 26, when the mouth part attachment member 8 is rotated by grasping the overcap 27.

After that, the mouth part attachment member 8 is moved in the axial direction so as to pull out the inner bag 4 from the container body 2. Since the mouth part attachment member 8 is engaged with the inner bag 4 in the axial direction, the axial force applied to the mouth part attachment member 8 is transmitted to the inner bag 4, and the inner bag 4 is pulled out from the container body 2. Since this pulling out is performed in a state where the inner bag 4 is pushed up from the container body 2, the force required to pull out the inner bag 4 is reduced.

The mouth part attachment member 8 can be moved in the axial direction by grasping the overcap 27. By screw-engaging the overcap 27 with the inner cap 26, detachment of the overcap 27 from the inner cap 26 can be avoided when the mouth part attachment member 8 is moved in the axial direction by grasping the overcap 27.

1-2. Method for Manufacturing Double Container 1

Figure 8:
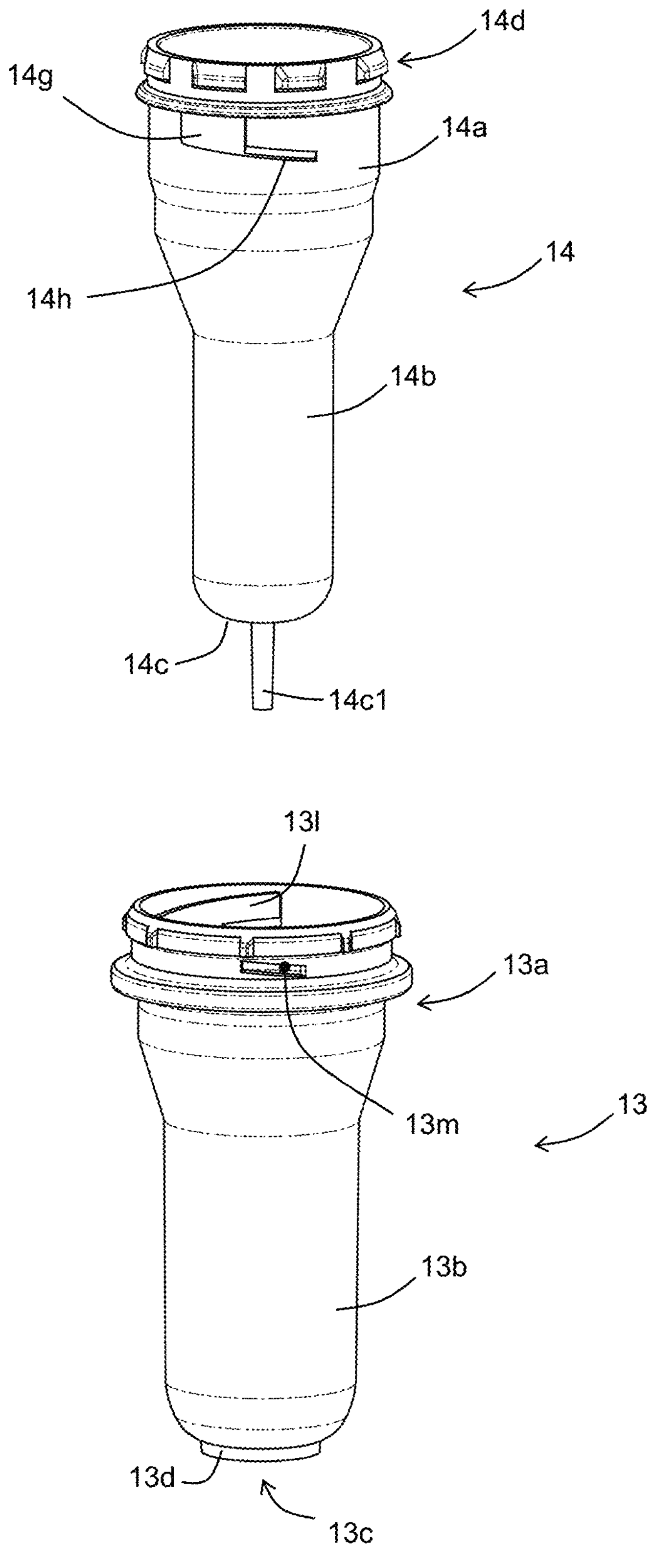
FIG. 8 is a perspective view showing a state in which an inner preform 14 and an outer preform 13 are separated.
Figure 9:
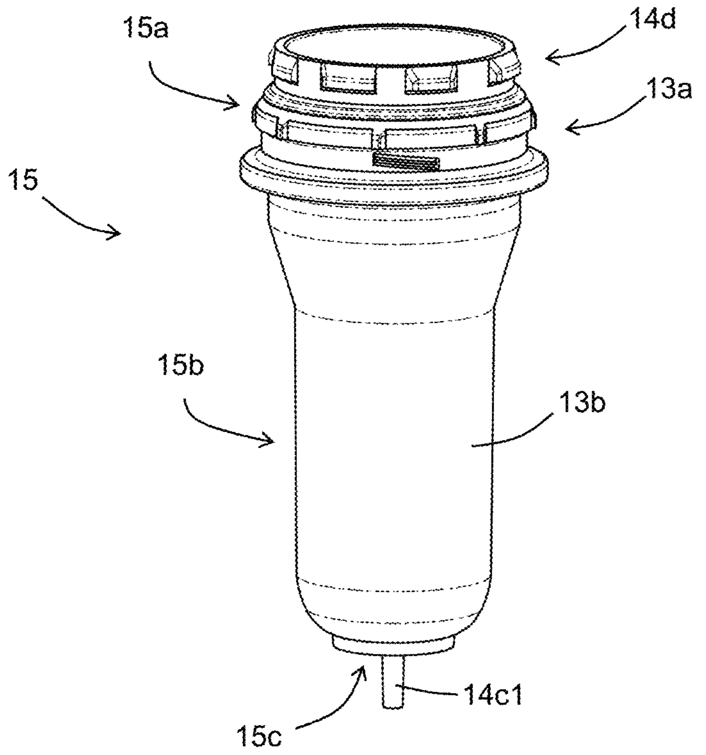
FIG. 9 shows a preform 15 configured by covering the inner preform 14 with the outer preform 13.

As shown in FIGS. 8 to 9, the container body 2 can be formed by heating a preform 15 and performing biaxial stretch blow molding.

<Configuration of Inner Preform 14, Outer Preform 13 and Preform 15>

In one example, the preform 15 can be configured by covering an inner preform 14, which will become the inner bag 4, with an outer preform 13, which will become the outer shell 3.

As shown in FIG. 8, the inner preform 14 has a bottomed cylindrical shape, and includes a mouth part 14*a*, a body part 14*b*, and a bottom part 14*c*. A projecting part 14*d* is provided at the opening end of the mouth part 14*a*. The projecting part 14*d* becomes the projecting part 4*c* in its original shape without being deformed during molding. Therefore, what has been described about the projecting part 4*c* also applies to the projecting part 14*d*. The bottom part 14*c* is provided to close the lower end of the body part 14*b*. A positioning pin 14*c*1 is provided on the bottom part 14*c*. The outer peripheral surface of the mouth part 14*a* of the inner preform 14 is provided with cam convex parts 14*g* and 14*h* that become the cam convex part 4*g* and the engagement convex part 4*h*, respectively.

As shown in FIG. 8, the outer preform 13 has a bottomed cylindrical shape, and includes a mouth part 13*a*, a body part 13*b*, and a bottom part 13*c*. The bottom part 13*c* is provided to close the lower end of the body part 13*b*. An annular convex part 13*d* and a positioning hole (not shown) are provided in the bottom part 13*c*. The mouth part 13*a* of the outer preform 13 has a cam rail 13*l*, which will become the cam rail 3*l*, and an engagement concave part 13*m*, which will become the engagement concave part 3*m*.

As shown in FIG. 9, when forming the preform 15, the projecting part 14*d* is abutted on the opening end of the mouth part 13*a*, and the positioning pin 14*c*1 is inserted into the positioning hole. Thereby, the inner preform 14 and the outer preform 13 are positioned relative to each other. In this state, the mouth part 14*a* and the mouth part 13*a* face each other, and the body part 14*b* and the body part 13*b* face each other.

The mouth parts 13*a* and 14*a* become the mouth part 15*a* of the preform 15, the body parts 13*b* and 14*b* become the body part 15*b* of the preform 15, and the bottom parts 13*c* and 14*c* become the bottom part 15*c* of the preform 15. The body part 15*b* and the bottom part 15*c* are mainly stretched in biaxial stretch blow molding.

<Concave-Convex Engagement at Mouth Part 15*a* of Inner Preform 14 and Outer Preform 13>

Incidentally, when the preform 15 is heated for biaxial stretch blow molding, the side of the inner peripheral surface of the preform 15 (that is, the side of the inner peripheral surface of the inner preform 14) is usually supported. As a method for transporting the preform 15, there are an upright transport with the bottom part 15*c* facing downward, and an inverted transport with the bottom part 15*c* facing upward. The upright transport is common and preferred. On the other hand, if the preform 15 is transported by the upright transport, there is a possibility that the outer preform 13 may come off the inner preform 14 and fall off. If the outer preform 13 and the inner preform 14 are tightly fitted in the mouth part 15*a*, it is possible to prevent the outer preform 13 from coming off. However, in that case, a new problem occurs that the inner bag 4 is difficult to separate from the container body 2, in the container body 2 obtained by molding.

Therefore, in the present embodiment, the inner preform 14 and the outer preform 13 are in concave-convex engagement at the mouth part 15*a* in order to prevent the outer preform 13 from falling out and allow the inner bag 4 to be easily pulled out from the container body 2 after use.

In the present embodiment, as shown in FIG. 8, the concave-convex engagement is an engagement between a convex part 14*h* provided on the outer peripheral surface of the mouth part 14*a* of the inner preform 14 and a concave part 13*m* provided on the inner peripheral surface of the mouth part 13*a* of the outer preform 13. The convex part 14*h* and the concave part 13*m* become the convex part 4*h* and the concave part 3*m*, respectively.

<Material and Manufacturing Method of Inner Preform 14 and Outer Preform 13>

The inner preform 14 and the outer preform 13 can be formed by direct blow molding or injection molding of a thermoplastic resin such as polyester (e.g., PET) or polyolefin (e.g., polypropylene, polyethylene). In one example, the inner preform 14 is configured of polyolefin (e.g., polypropylene), and the outer preform 13 is configured of PET.

The inner preform 14 is preferably formed by direct blow molding. According to direct blow molding (blow molding using a tubular parison in a molten state), the inner preform 14 of the laminated structure can be easily formed. The outer preform 13 is preferably formed by injection molding.

2. Second Embodiment

Figure 10A:
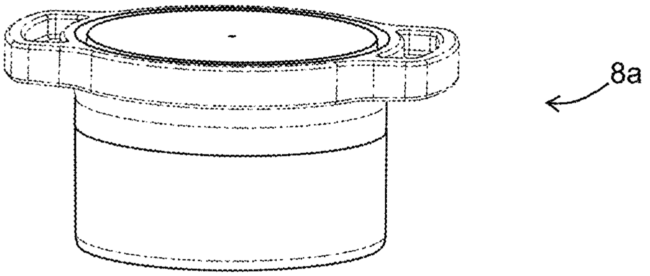
FIGS. 10A and 10B show a cap 8*a* of the double container 1 of the second embodiment of the present invention.
Figure 10B:
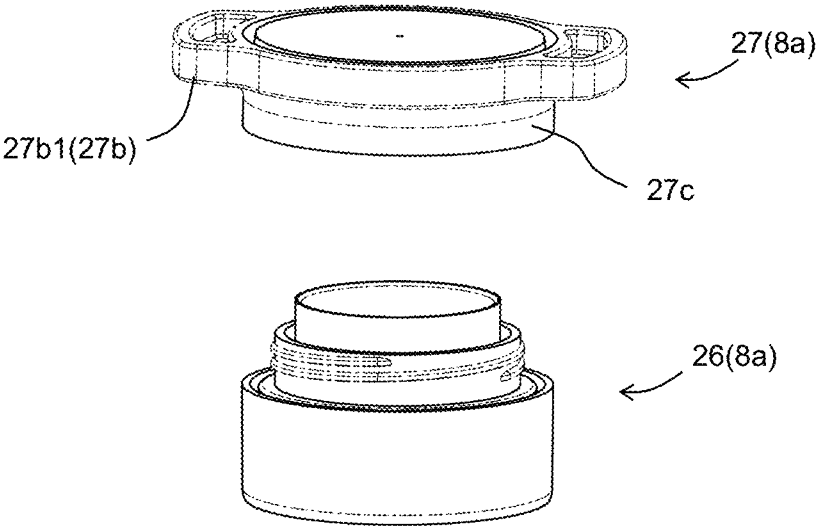
Figure 11:
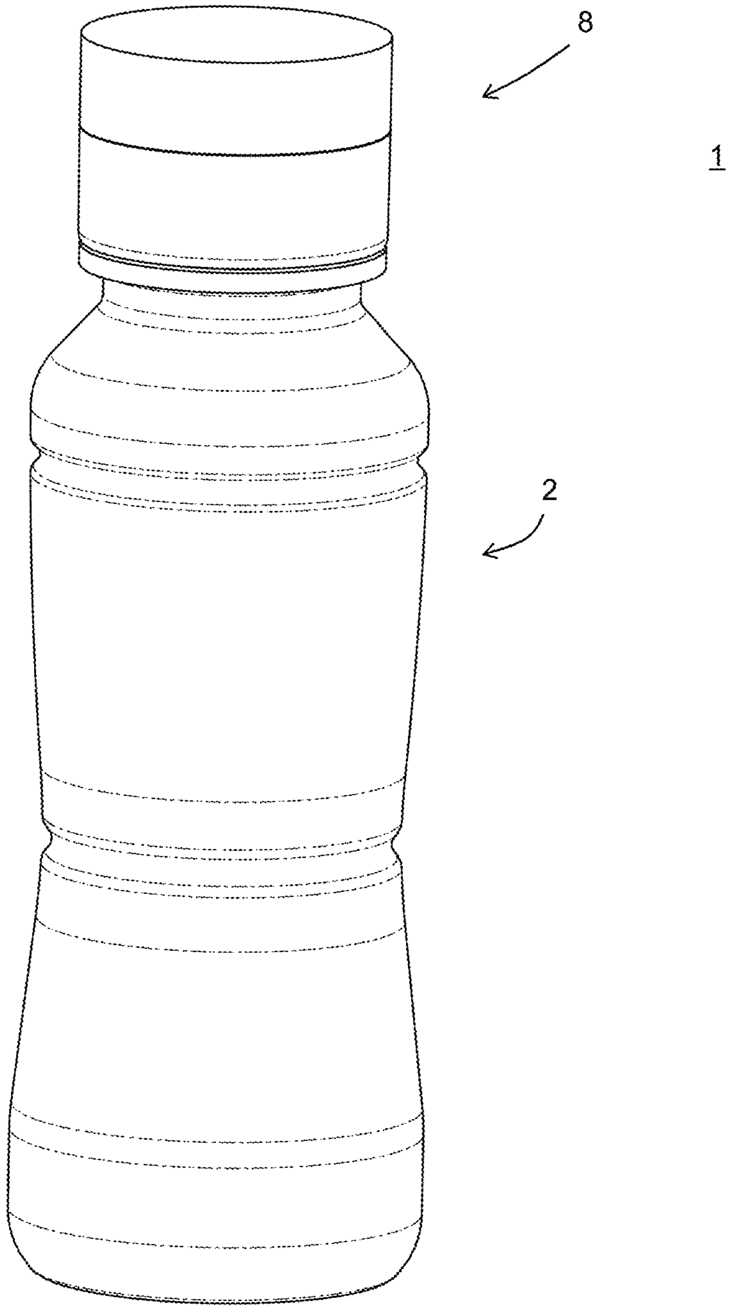
FIG. 11 is a perspective view of the double container 1 of the third embodiment of the present invention.

FIGS. 10A to 10B is used to describe the second embodiment of the present invention. The present embodiment is similar to the first embodiment, and the main difference is the shape of the projecting part 27*b*1. Hereinafter, the difference will be mainly described.

In the present embodiment, as shown in FIG. 10, the projecting part 27*b*1 is provided at a part in the circumferential direction of the overcap 27. The projecting part 27*b*1 is provided at two locations 180 degrees apart. According to such a configuration, the effect that it is easy to grasp the overcap 27 and rotate the mouth part attachment member 8 is achieved.

Modifications of First and Second Embodiments

- The mouth part attachment member 8 may be a screw type. In this case, the inner cap 26 and the outer shell 3 are screw-engaged. When pulling out the inner bag 4, after releasing the screw engagement between the inner cap 26 and the outer shell 3, the mouth part attachment member 8 can be moved in the axial direction to pull out the inner bag 4 from the container body 2 by grasping the overcap 27 and moving it in the axial direction.
- For example, the hooking part 27*b* may be configured to have a concave part provided on the side of the overcap 27 such that a finger can be inserted into the concave part to hook it.
- The configuration for pushing up the inner bag 4 from the container body 2 by relative rotation of the inner bag 4 and the outer shell 3 can be omitted.

3. Third Embodiment

The present embodiment is similar to the first embodiment, and the contents described in the first embodiment can be applied to the present embodiment as long as they do not contradict the spirit thereof. Hereinafter, the difference will be mainly described.

3-1. Configuration of Double Container 1

<Basic Configuration>

The double container 1 of the present embodiment has the structure shown in FIGS. 11 to 15B.

The mouth part attachment member 8 may or may not have a check valve (not shown). If the mouth part attachment member 8 is not provided with a check valve, since the inner bag 4 does not shrink even after the content of the inner bag 4 is discharged, a sound is likely to be generated when the inner bag 4 is pulled out from the container body 2, as described below.

Figure 15A:
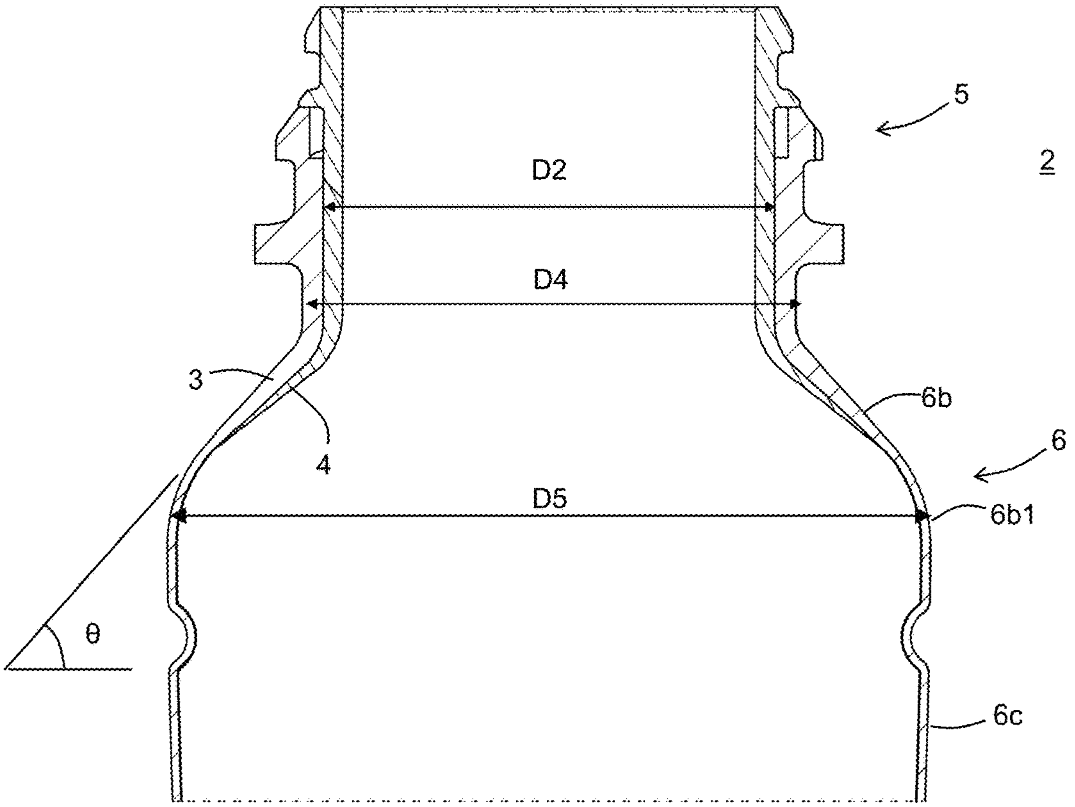
FIG. 15A is an enlarged view of a region A in FIG. 14.

As shown in FIG. 15A, the inner diameter D2 of the mouth part 5 of the outer shell 3 is, for example, 20 to 50 mm, and preferably 25 to 40 mm (29.5 mm in the present embodiment). The outer diameter D4 of the root of the mouth part 5 of the outer shell 3 is, for example, 25 to 55 mm, and preferably 30 to 45 mm. The inner diameter D2 is, specifically for example, 20, 25, 30, 35, 40, 45, or 50 mm, and the outer diameter D4 is, specifically for example, 25, 30, 35, 40, 45, 50, or 55 mm. Each of these diameters may be in the range between the two values exemplified herein. The length of the mouth part 5 is, for example, 15 to 35 mm, specifically for example, 15, 20, 25, 30, or 35 mm, and may be in the range between the two values exemplified herein.

<Structure of Body Part 6>

The body part 6 is arranged adjacent to the mouth part 5 on a side farther from the opening end 5*c* than the mouth part 5. The body part 6 has a larger outer diameter than the mouth part 5 (in the present specification, the "outer diameter" means the diameter of a circumscribed circle when the cross section is not circular). The body part 6 is tubular. The body part 6 has a shoulder part 6*b* whose outer diameter increases as the distance from the mouth part 5 increases. The body part 6 has a body part body 6*c*, which is closer to the bottom 7 than the shoulder part 6*b*. At least a part of the body part body 6*c* is connected to the lower end 6*b*1 of the shoulder part 6*b*, and has a shape with a constant outer diameter towards the bottom part 7, or a shape in which the diameter is reduced towards the bottom part 7.

Figure 13A:
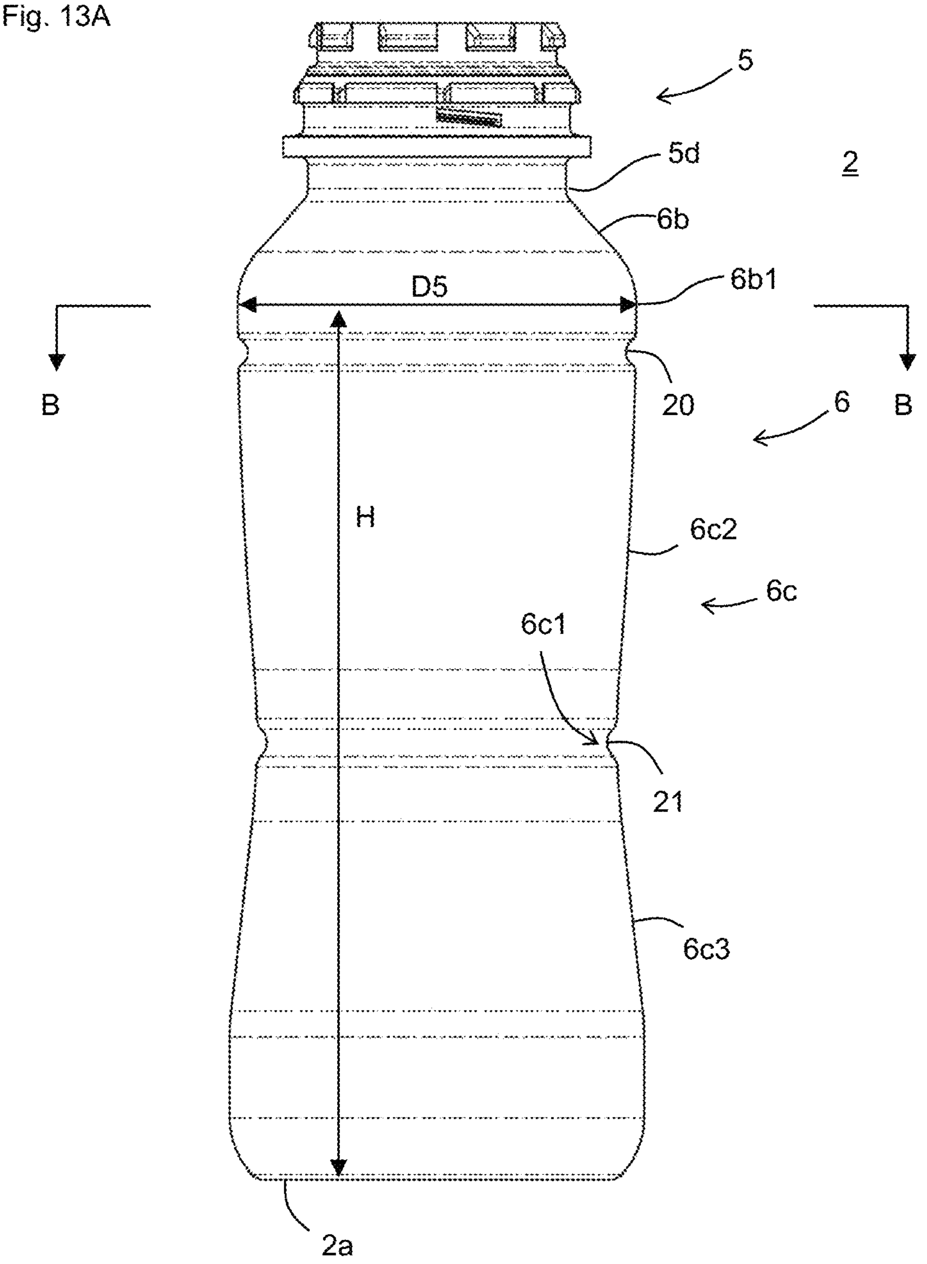
FIG. 13A is a front view of a container body 2 of the double container 1 in FIG. 11.

As shown in FIG. 13A, the body part body 6*c* is preferably provided with annular groove ribs 20 and 21. When the height from the ground surface 2*a* of the container body 2 to the lower end 6*b*1 of the shoulder part 6*b* is H, the annular groove rib 20 is provided at the position of 0.80H to 0.99H from the ground surface 2*a* (0.93H in the present embodiment). The annular groove rib 21 is provided at the position of 0.20H to 0.70H from the ground surface 2*a* (0.5H in the present embodiment). One or both of the annular groove ribs 20 and 21 can be omitted.

Figure 13B:
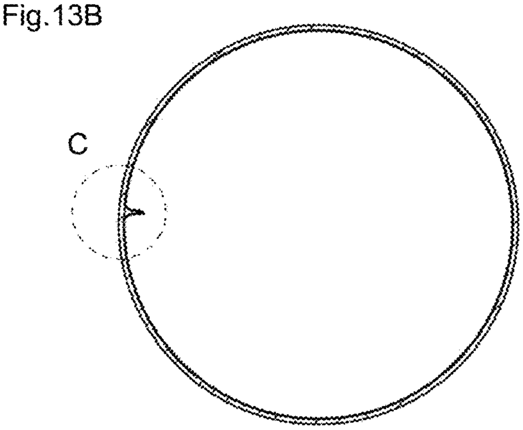
FIG. 13B is a cross-sectional view along a B-B line in FIG. 13A.
Figure 13C:
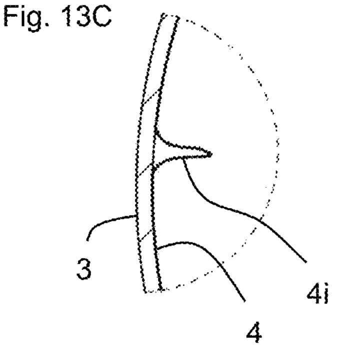
FIG. 13C is an enlarged view of an area C in FIG. 13B.
Figure 14:
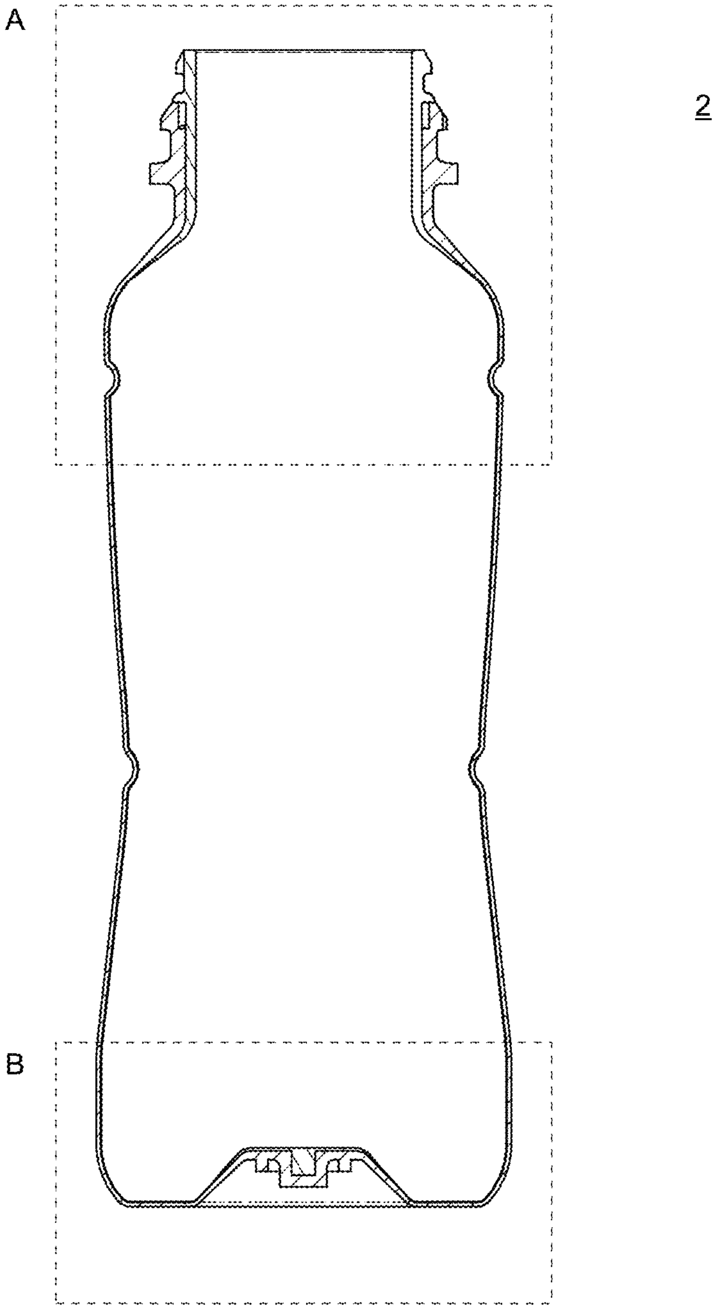
FIG. 14 is a cross-sectional view through a central axis of a mouth part 5 of the container body 2 in FIG. 13A.

When the container body 2 is formed by biaxial stretch blow molding, after biaxial stretch blow molding and before filling the content, the inner bag 4 may shrink and the capacity of the inner bag 4 may decrease. Since it is possible to assume that the entire inner bag 4 shrinks such that it deflates, no particular problem is likely to occur. However, as shown in FIGS. 13B to 13C, during shrinkage, the inner bag 4 may be folded inward to form an internally bending part 4*i* that projects from the inner surface of the inner bag 4. The internally bending part 4*i* tends to be formed first at the lower end 6*b*1 of the shoulder part 6*b* of the container body 2, where the blow ratio is relatively large. When the internally bending part 4*i* is formed in this part, the internally bending part 4*i* is extended toward the body part body 6*c* of the container body 2. As a result, the internally bending part 4*i* is formed over a wide area of the body part body 6*c*. When the internally bending part 4*i* is formed, the diameter of the inner bag 4 is reduced by the amount of the internally bending part 4*i* in that part. Therefore, when the internally bending part 4*i* is formed over a wide area of the body 6*c*, the degree of capacity reduction of the inner bag 4 increases.

The annular groove rib 20 is provided at a position adjacent to the shoulder part 6*b* of the body part body 6*c*. If the internally bending part 4*i* is extended over a wide area of the body part body 6*c*, the capacity of the inner bag 4 decreases significantly. However, in the present embodiment, the extension of the internally bending part 4*i* is stopped by the annular groove rib 20 provided in the above-mentioned position. For this reason, it is possible to suppress the formation of the internally bending part 4*i* over a wide area of the body part body 6*c*. The annular groove rib 20 can be provided at a position of α×H from the ground surface 2*a*, where α is, specifically for example, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, or 0.99, and may be in the range between the two values exemplified herein.

When the outer diameter of the shoulder part 6*b* at the lower end 6*b*1 is D5, D5/D4 is preferably 1.3 or more (1.5 in the present embodiment). Usually, the larger this value, the greater the degree of stretching of the preform 15 at the lower end 6*b*1 during biaxial stretch blow molding. Further, the greater the degree of stretching of the preform 15 at the lower end 6*b*1, the more likely the internally bending part 4*i* is generated due to shrinkage of the inner bag 4.

Therefore, the technical significance of providing the annular groove rib 20 becomes more prominent. This value is, for example, 1.3 to 3.0, specifically for example, 1.3, 1.4, 1.5, 1.6, 1.7, 1.8, 1.9, 2.0, 2.5, or 3.0, and may be in the range between the two values exemplified herein.

The inclination angle θ of the shoulder part 6*b* with respect to the ground surface 2*a* is preferably 60 degrees or less (48 degrees in the present embodiment). The smaller this angle, the more prominent the degree that the outer diameter increases toward the lower end 6*b*1 in the shoulder part 6*b*, and the more likely it is that the internally bending part 4*i* is generated. The angle θ is, for example, 40 to 60 degrees, specifically for example, 40, 41, 42, 43, 44, 45, 46, 47, 48, 49, 50, 51, 52, 53, 54, 55, 56, 57, 58, 59, or 60 degrees, and may be in the range between the two values exemplified herein.

The annular groove rib 20 is preferably configured of a curved surface projecting toward the inside of the container body 2, and preferably includes an arc surface. The width of the annular groove rib 20 is, for example, 1 to 20 mm, and preferably 2 to 8 mm. This width is, specifically for example, 1, 2, 3, 4, 5, 6, 7, 8, 9, 10, 11, 12, 13, 14, 15, 16, 17, 18, 19, or 20 mm, and may be in the range between the two values exemplified herein. The depth of the annular groove rib 20 is, for example, 0.5 to 5 mm, and preferably 1 to 3 mm. This depth is, specifically for example, 0.5, 1.0, 1.5, 2.0, 2.5, 3.0, 3.5, 4.0, 4.5, or 5.0 mm, and may be in the range between the two values exemplified herein.

The annular groove rib 21 is provided to increase the rigidity of the body part body 6*c*. When the content is supposed to be discharged by tilting the double container 1, if the rigidity of the body part body 6*c* is too low, the body part body 6*c* may be compressed unintentionally, causing the content to come out too much. In the present embodiment, the annular groove rib 21 is provided to increase the rigidity of the body part body 6*c* and suppress the occurrence of the above-mentioned problem. The annular groove rib 21 can be provided at a position β×H from the ground surface 2*a*, where β is, specifically for example, 0.20, 0.25, 0.30, 0.35, 0.40, 0.45, 0.50, 0.55, 0.60, 0.65, or 0.70, and may be in the range between the two values exemplified herein. The description of the width and depth of the annular groove rib 21 is the same as that of the annular groove rib 20.

The body part body 6*c* preferably has a constricted shape such that the diameter of the body part body 6*c* is minimum at a position of 0.20H to 0.70H (0.50H in the present embodiment) from the ground surface 2*a*. In this case, the container body 2 is easier to grasp. The thinnest part 6*c*1 of the constricted shape can be provided at the position of γ×H from the ground surface 2*a*, and the description of γ is the same as that of β. The body part body 6*c* preferably includes a part 6*c*2 between the lower end 6*b*1 and the part 6*c*1, which is reduced in diameter toward the part 6*c*1, and a part 6*c*3 between the bottom part 7 and the part 6*c*1, which is reduced in diameter toward the part 6*c*1.

<Structure of Bottom Part 7>

Figure 15B:
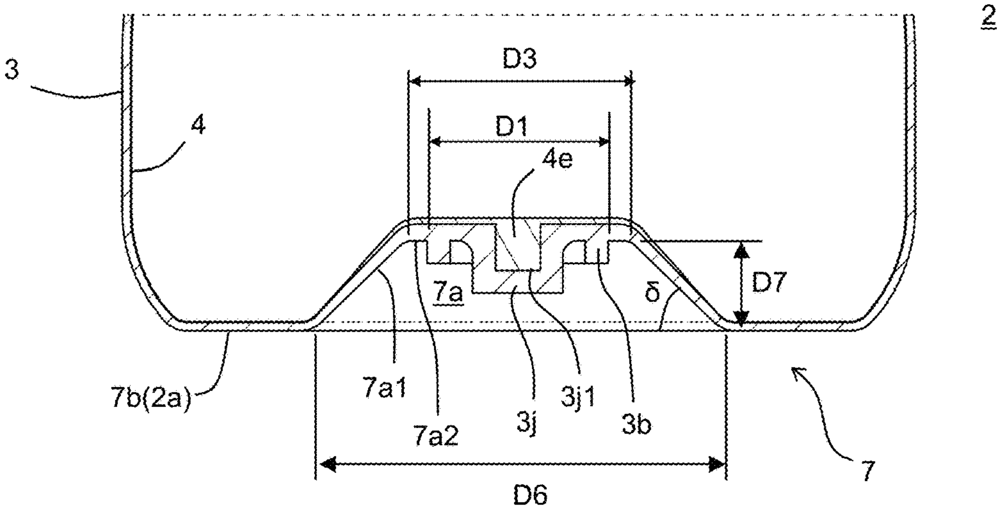
FIG. 15B is an enlarged view of a region B in FIG. 14.

The bottom part 7 is provided at the lower end of the body 6 and closes the lower end of the body 6. As shown in FIG. 15B, the bottom part 7 of the inner bag 4 is provided with a projection 4*e*. The bottom part 7 of the outer shell 3 is provided with an annular convex part 3*b*, and a hollow projection 3*j* is provided in the inner region of the annular convex part 3*b*. The hollow projection 3*j* is provided with a concave part 3*j*1, and the inner bag 4 is positioned with respect to the outer shell 3 by inserting the projection 4*e* into the concave part 3*j*1. Since the annular convex part 3*b* and its inner region are hardly stretched during biaxial stretch blow molding, the thickness is larger in both the outer shell 3 and the inner bag 4. The annular convex part 3*b* can be omitted.

When the outer diameter of the annular convex part 3*b* is D1 and the inner diameter of the mouth part 5 of the outer shell 3 is D2, D1/D2 is preferably 0.9 or less, and more preferably 0.6 or less. Since the annular convex part 3*b* and its inner region have a larger thickness of the inner bag 4, the smaller D1/D2 is, the easier it is for the bottom part 7 of the inner bag 4 to be reduced in diameter. D1/D2 is, for example, 0.1 to 0.9, specifically for example, 0.1, 0.2, 0.3, 0.4, 0.5, 0.6, 0.7, 0.8, or 0.9, and may be in the range between the two values exemplified herein, or may be equal to or less than any one of the values exemplified herein.

A bottom part concave region 7*a* and a peripheral edge region 7*b* surrounding the bottom part concave region 7*a* are provided on the bottom part 7 of the container body 2 (i.e., the bottom part 7 of each of the inner bag 4 and the outer shell 3). The bottom part concave region 7*a* is a region where the bottom part 7 is concave toward the inside of the container body 2. The peripheral edge region 7*b* serves as the ground surface 2*a* of the container body 2. As shown in FIG. 15B, on the peripheral surface 7*a*1 of the bottom part concave region 7*a*, the thickness of each of the inner bag 4 and the outer shell 3 gradually decreases toward the peripheral edge region 7*b*. The peripheral surface 7*a*1 is an inclined surface that is inclined away from the center of the bottom part 7 toward the peripheral edge region 7*b*. In other words, the peripheral surface 7*a*1 constitutes a part of a cone that shrinks toward the bottom surface 7*a*2 of the bottom part concave region 7*a*. The bottom surface 7*a*2 of the bottom part concave region 7*a* has a substantially flat part leading to the peripheral surface 7*a*1. Therefore, the bottom part concave region 7*a* has a substantially truncated cone shape.

The bottom surface 7*a*2 of the bottom part concave region 7*a* is difficult to stretch during biaxial stretch blow molding, and tends to be thick. Therefore, the smaller the diameter D3 of the bottom surface 7*a*2 (in other words, the diameter of the region surrounded by the boundary line between the bottom surface 7*a*2 and the peripheral surface 7*a*1), the easier the diameter of the bottom part 7 of the inner bag 4 is reduced. D3/D2 is preferably 0.9 or less, and more preferably 0.6 or less. D3/D2 is, for example, 0.1 to 0.9, specifically for example, 0.1, 0.2, 0.3, 0.4, 0.5, 0.6, 0.7, 0.8, or 0.9, and may be in the range between the two values exemplified herein, or may be equal to or less than any one of the values exemplified herein.

Incidentally, the container body 2 of the present embodiment preferably has no outside air introduction hole (opening) in the outer shell 3 at the part closer to the bottom part 7 than the root 5*d* of the mouth part 5 (i.e., the body part 6 and the bottom part 7). In this case, when the inner bag 4 is pulled out from the container body 2, the inside of the outer shell 3 is in a closed state when the inner bag 4 blocks the root 5*d* of the mouth part 5 of the outer shell 3. When the inner bag 4 is pulled out from this state by applying more force to the inner bag 4, a pleasant “pop” sound is generated when the inner bag 4 is pulled out. The generation of such a sound may motivate the user to pull out the inner bag 4 to enjoy the sound, or it may motivate the user to pull out the inner bag 4 on the next occasion as well because it is easy to remember that the inner bag 4 was pulled out.

When the diameter of the edge of the bottom part concave region 7*a* is D6, D6/D2 is preferably 0.70 to 1.20, and more preferably 0.85 to 1.00. If this value is too small, the sound when pulling out the inner bag 4 may be too small, and if this value is too large, the force required to pull out the inner bag 4 may be too large. This value is, specifically for example, 0.70, 0.75, 0.80, 0.85, 0.90, 0.95, 1.00, 1.05, 1.10, 1.15, or 1.20, and may be in the range between the two values exemplified herein.

The inclination angle δ of the peripheral surface 7*a*1 of the bottom part concave region 7*a* with respect to the ground surface 2*a* of the container body 2 is preferably 30 to 70 degrees (43.8 degrees in the present embodiment). If the angle δ is too small, the force required to pull out the inner bag 4 may be too large, and if the angle δ is too large, the sound when pulling out the inner bag 4 may be too small. The angle δ is, specifically for example, 30, 35, 40, 45, 50, 55, 60, 65, or 70 degrees, and may be in the range between the two values exemplified herein.

The depth D7 of the bottom part concave region 7*a* is, for example, 2 to 10 mm, specifically for example, 2, 2.5, 3, 3.5, 4, 4.5, 5, 5.5, 6, 6.5, 7, 7.5, 8, 8.5, 9, 9.5, or 10 mm, and may be in the range between the two values exemplified herein.

<Structure of Mouth Part Attachment Member 8 and Engagement Structure Between Mouth Part Attachment Member 8 and Container Body 2>

Figure 12:
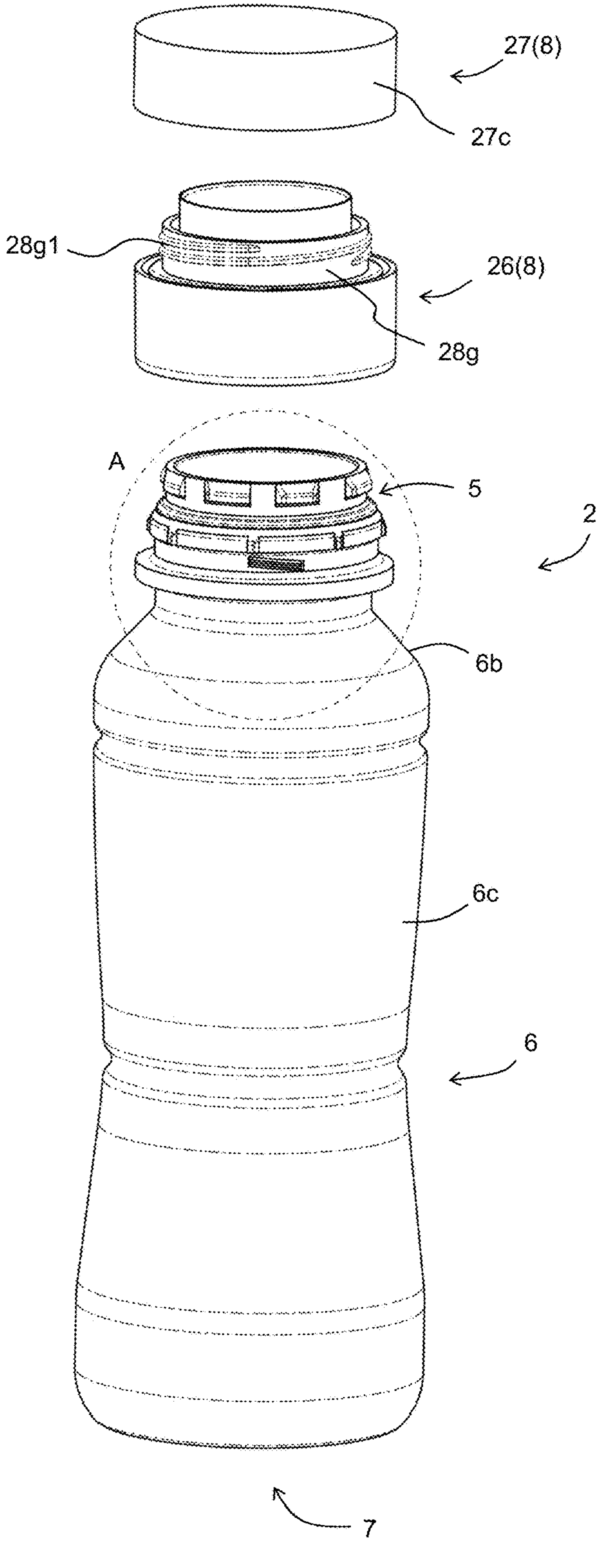
FIG. 12 is an exploded perspective view of FIG. 11.

As shown in FIG. 12, the mouth part attachment member includes an inner cap 26 and an overcap 27. The overcap 27 can be omitted. The inner cap 26 is engaged with the inner bag 4 in the axial direction, and may or may not be engaged in the circumferential direction. The overcap 27 is engaged with the inner cap 26. This engagement may be a screw engagement or a snap engagement. Others are the same as in the first embodiment.

<Method for Pulling Out Inner Bag 4>

The inner bag 4 can be pulled out in the same manner as in the first embodiment. However, it is not necessary to grasp the overcap 27 to rotate or axially move the inner bag 4, and the inner bag 4 can be rotated or axially moved by an arbitrary method.

If the outside air introduction hole is not provided in the outer shell 3 at the part closer to the bottom part 7 than the root 5*d* of the mouth part 5, when the inner bag 4 is pulled out, the inside of the outer shell 3 is in a closed state when the inner bag 4 blocks the root 5*d* of the mouth part 5 of the outer shell 3. If the inner bag 4 is pulled out from this state by applying more force to the inner bag 4, a pleasant “pop” sound can be generated when the inner bag 4 is pulled out.

3-2. Method for Manufacturing Double Container 1

Figure 16:
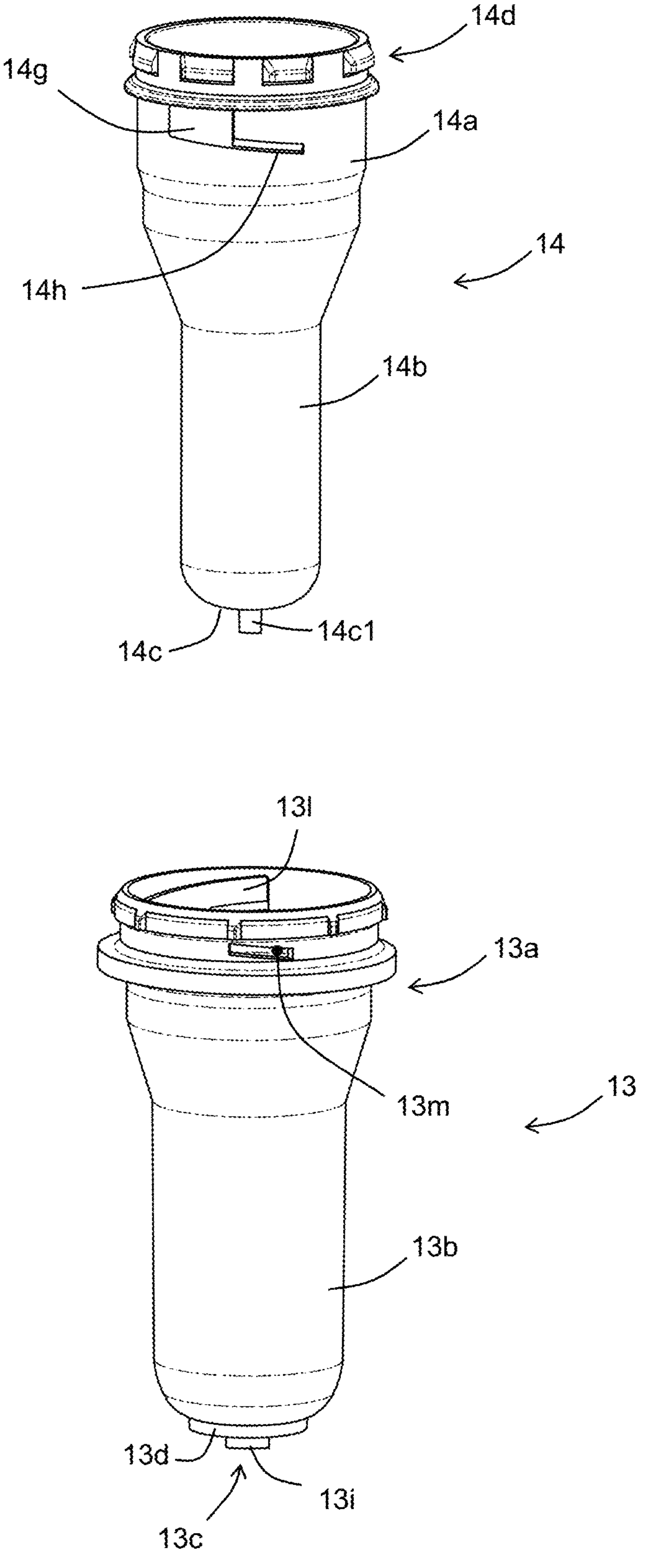
FIG. 16 is a perspective view showing a state in which the inner preform 14 and the outer preform 13 are separated.
Figure 17:
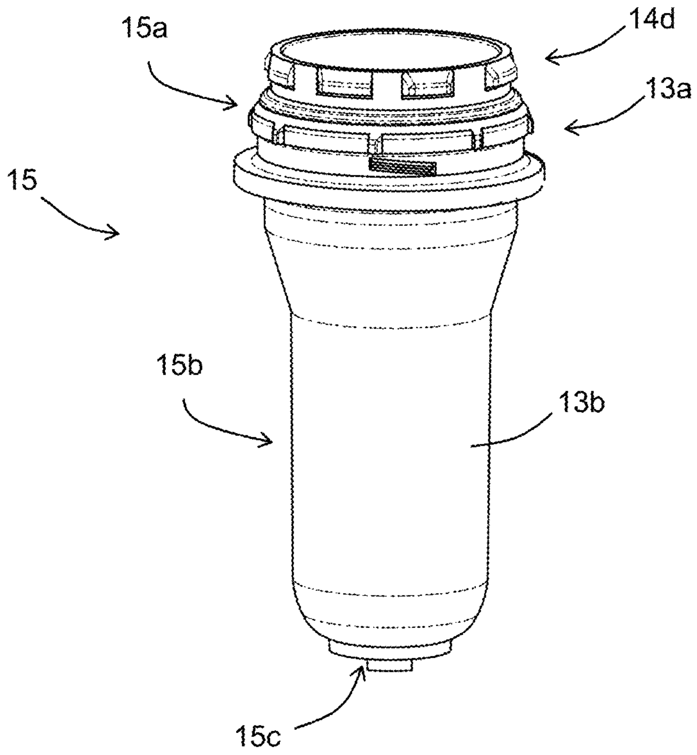
FIG. 17 is a perspective view showing the preform 15 configured by covering the inner preform 14 with the outer preform 13.
Figure 18:
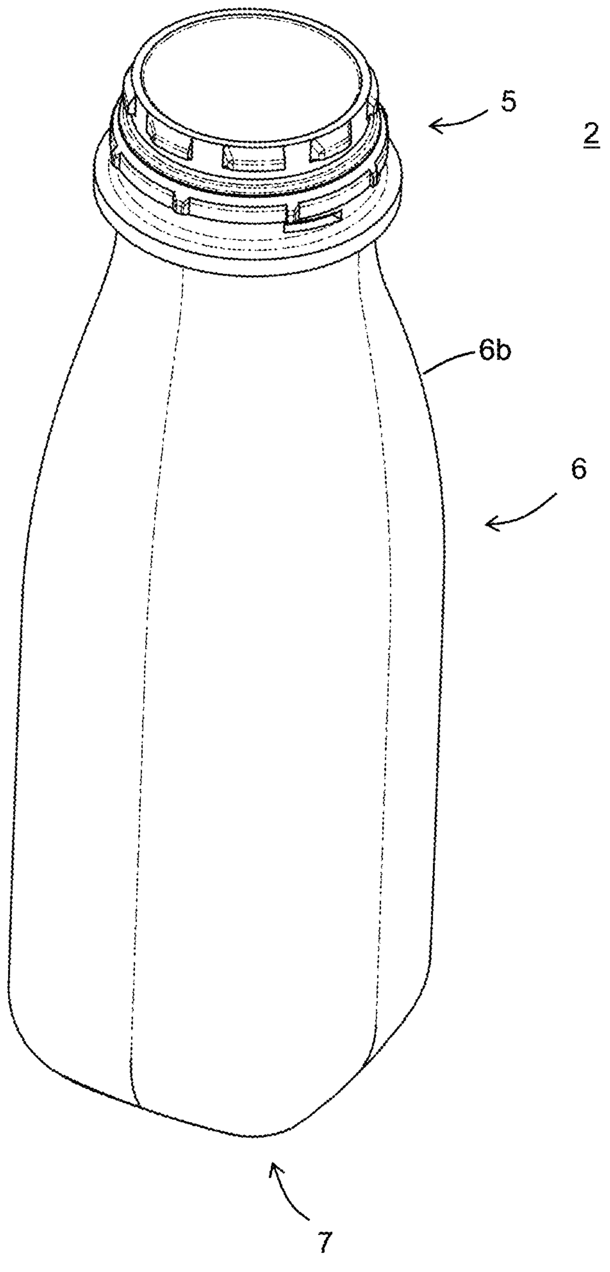
FIG. 18 shows the container body 2 of the double container 1 of the fourth embodiment of the present invention.

In the present embodiment, as shown in FIGS. 16 to 17, the bottom part 13*c* of the outer preform 13 is provided with a hollow projection 13*i*, and the positioning pin 14*c*1 of the inner preform 14 is inserted into a concave part provided in the hollow projection 13*i* when the preform 15 is formed. Others are the same as in the first embodiment.

4. Fourth Embodiment

Using FIGS. 18 to 20B, the fourth embodiment of the present invention will be described. The present embodiment is similar to the third embodiment, and the main difference is the shape of the container body 2. Hereinafter, the difference will be mainly described.

Figure 19A:
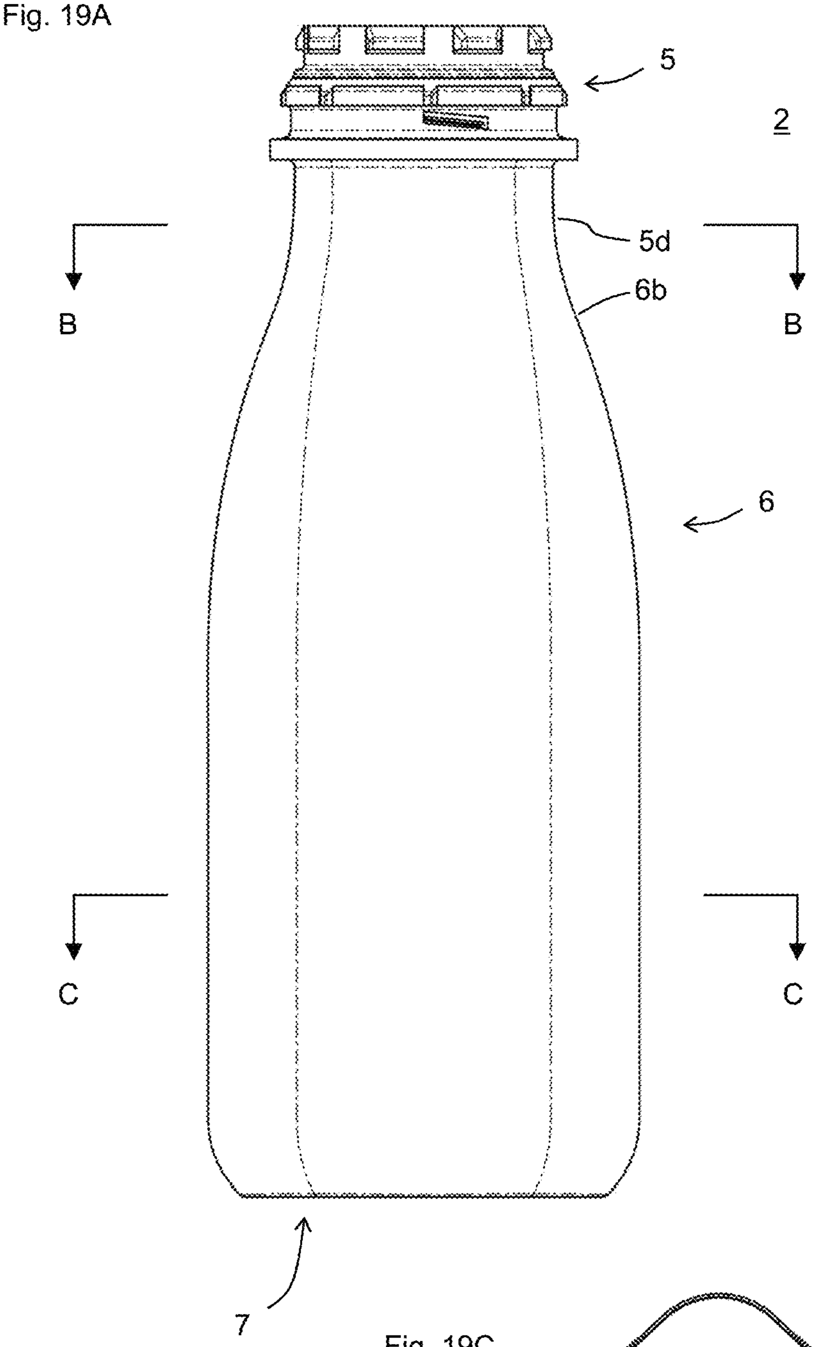
FIG. 19A is a front view of the container body 2 of FIG. 18, and FIGS. 19B and 19C are cross-sectional views along a B-B line and a C-C line in FIG. 19A, respectively.
Figure 19B:
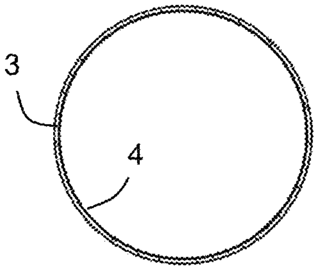
Figure 19C:
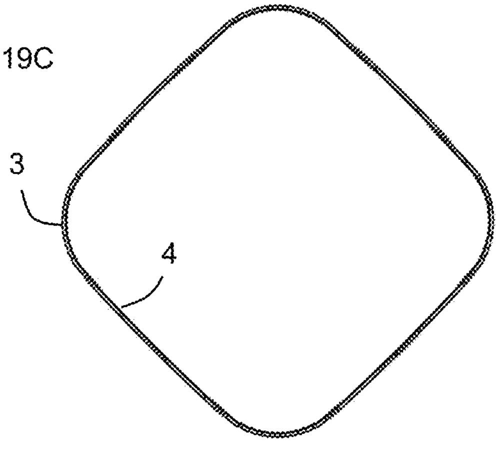
Figure 20A:
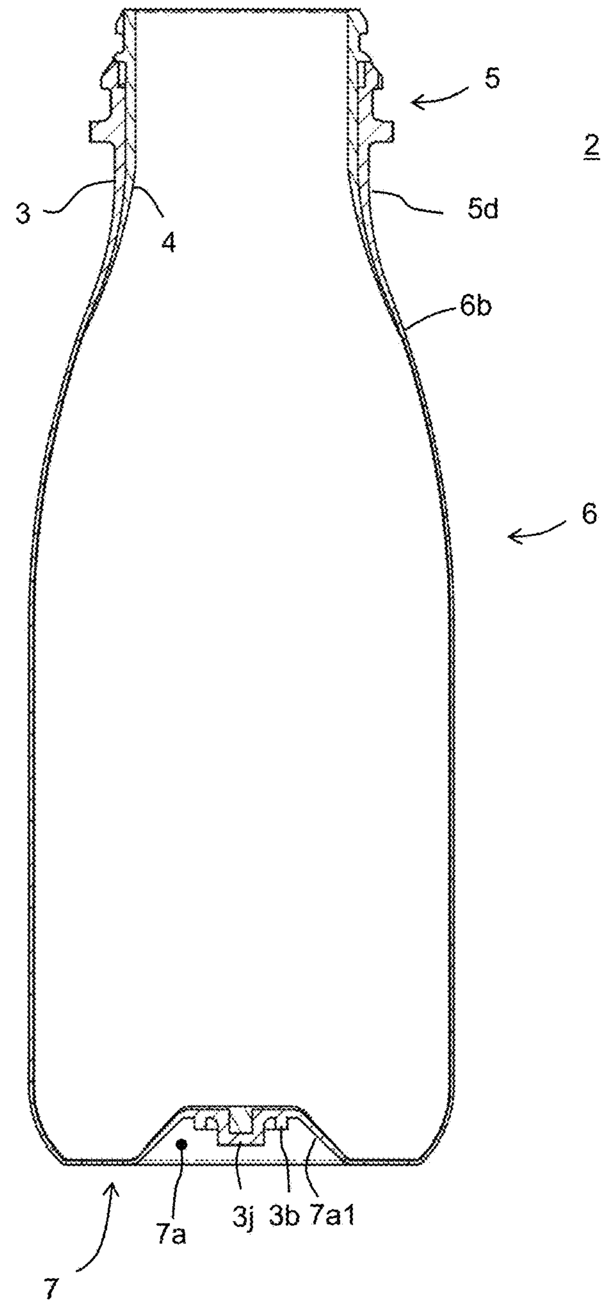
FIG. 20A is a cross-sectional view through the central axis of the mouth part 5 of the container body 2 in FIG. 18.
Figure 20B:
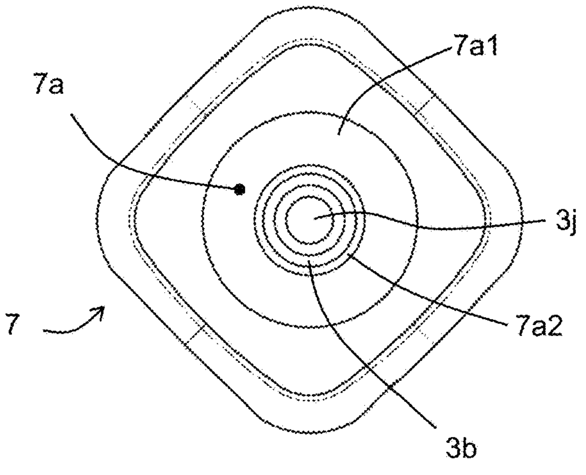
FIG. 20B is a bottom view of FIG. 20A.
Figure 21:
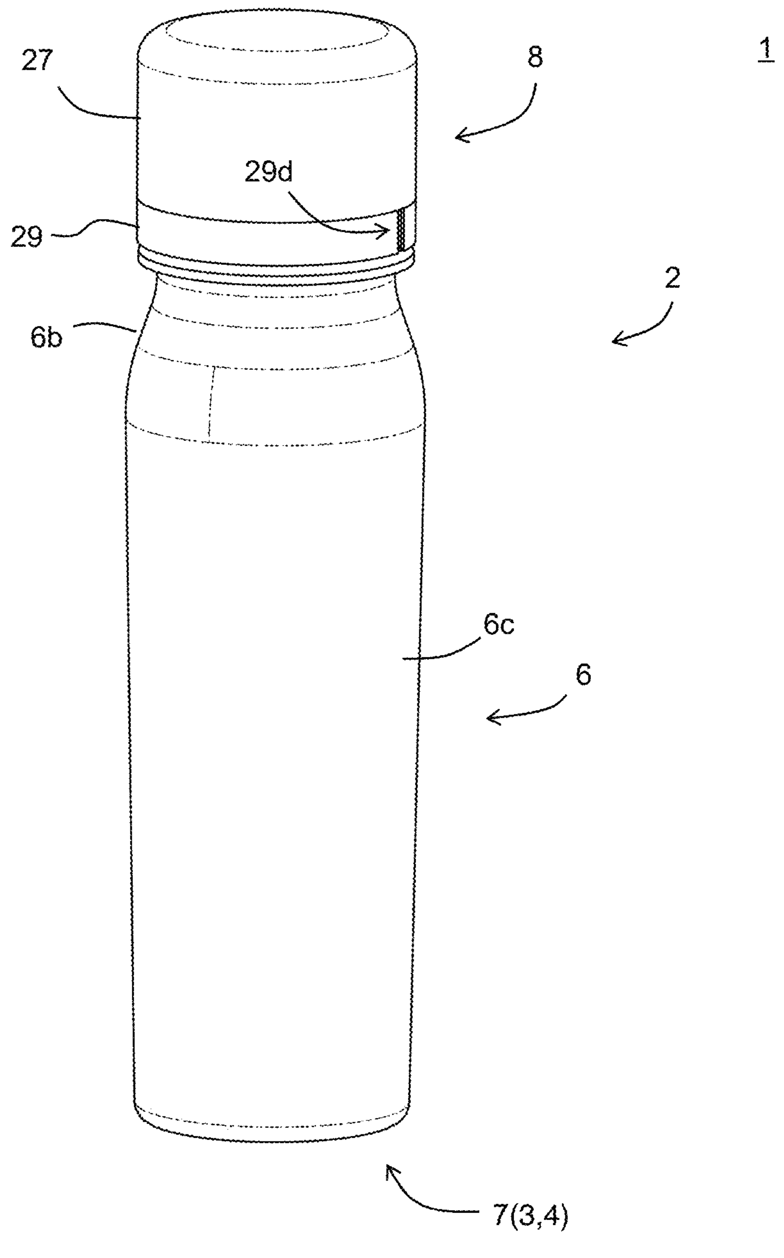
FIG. 21 is a perspective view of the double container 1 of the fifth embodiment of the present invention.
Figure 22:
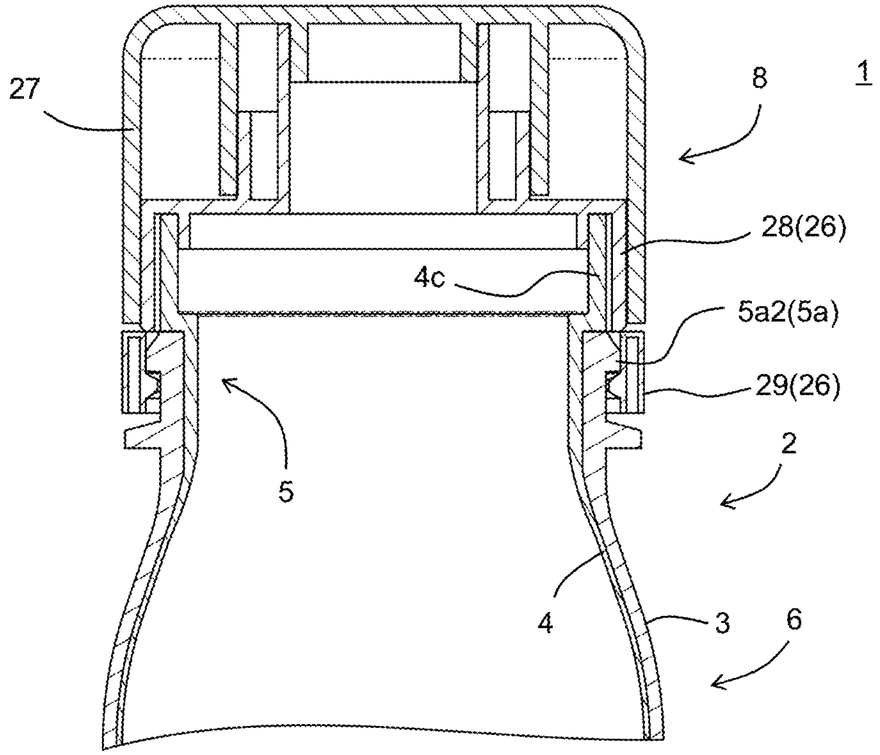
FIG. 22 is a cross-sectional view of a vicinity of the mouth part 5 of the double container 1 of FIG. 21.

In the present embodiment, the body 6 of the container body 2 has a circular cross section in a part close to the mouth part 5 as shown in FIG. 19B, and a cross section of a square with rounded corners in a part close to the bottom part 7 as shown in FIG. 19C. In the shoulder part 6*b*, the shape of the cross section gradually changes from a circular shape to a square shape with rounded corners. As shown in FIGS. 20A to 20B, the shape of the bottom part concave region 7*a* is the same as in the third embodiment, and the annular convex part 3*b* and the hollow projection 3*j* are provided in the bottom part concave region 7*a*. The peripheral surface 7*a*1 constitutes a part of a cone that tapers toward the bottom part 7*a*2 of the bottom part concave region 7*a*, and the bottom part concave region 7*a* has a substantially truncated cone shape. Even in the container body 2 with such a shape, if the outer shell 3 is not provided with an outside air introduction hole at the part closer to the bottom part 7 than the root 5*d* of the mouth part 5, when the inner bag 4 is pulled out, the inside of the outer shell 3 is in a closed state when the inner bag 4 blocks the root 5*d* of the mouth part 5 of the outer shell 3. If the inner bag 4 is pulled out from this state by applying additional force to the inner bag 4, a pleasant "pop" sound can be generated when pulling out the inner bag 4.

(Example of Second Perspective)

(1) Manufacture of Container Body 2

Example 1

According to the method described above, the container body 2 (capacity: 300 mL) shown in FIGS. 11 to 15B was manufactured by heating the preform 15 shown in FIGS. 16 to 17 at 110° C. (temperature at the center of the preform 15 in the longitudinal direction) and performing biaxial stretch blow molding. The inner preform 14 was manufactured by injection molding homopolypropylene (model: Novatech, made by Japan Polypropylene Corporation). The outer preform 13 was manufactured by injection molding PET (model: titanium-based catalyst grade, made by Teijin Limited) at 300° C. into the shape of the outer preform and then rapidly cooling it to 20° C. The rapid cooling turned the PET in a molten state into an amorphous state. The inner diameter of the mouth part 13*a* of the outer preform 13 (=inner diameter D2 of the mouth part 5 of the outer shell 3) was 29.5 mm.

Comparative Example 1

The container body 2 was manufactured in the same manner as in Example 1, except for not providing the annular groove rib 20 in the body part body 6*c*.

(2) Evaluation

Ten container bodies 2 of Example 1 and Comparative Example 1 were each manufactured, and the presence or absence of the internally bending part 4*i* was visually checked. For both Example 1 and Comparative Example 1, the internally bending part 4*i* was formed near the lower end 6*b*1 of the shoulder part 6*b* in one out of ten containers. In the container body 2 of Example 1, the internally bending part 4*i* stopped at the upper edge of the annular groove rib 20. On the other hand, in the container body 2 of Comparative Example 1, the internally bending part 4*i* reached the upper edge of the annular groove rib 21.

(Example of Sixth Perspective)

(1) Manufacture of Container Body 2

Example 1

According to the method described above, the container body 2 (capacity: 300 mL) shown in FIGS. 11 to 15B and Table 1 was manufactured by heating the preform 15 shown in FIGS. 16 to 17 at 110° C. (temperature at the center of the preform 15 in the longitudinal direction) and performing biaxial stretch blow molding. The inner preform 14 was manufactured by injection molding homopolypropylene (model: Novatech, made by Japan Polypropylene Corporation). The outer preform 13 was manufactured by injection molding PET (model: titanium-based catalyst grade, made by Teijin Limited) at 300° C. into the shape of the outer preform and then rapidly cooling it to 20° C. The rapid cooling turned the PET in a molten state into an amorphous state. The inner diameter of the mouth part 13*a* of the outer preform 13 (=inner diameter D2 of the mouth part 5 of the outer shell 3) was 29.5 mm.

Examples 2 to 4

The container body 2 was manufactured in the same manner as in Example 1, except that the shape of the bottom part concave region 7*a* was changed as shown in Table 1.

Comparative Example 1

The container body 2 was manufactured in the same manner as in Example 1, except that an opening was provided in the bottom part 13*c* as the outer preform 13. An outside air introduction hole was formed in the bottom part 7 of the outer shell 3 of the obtained container body 2.

(2) Evaluation of Pull-Out Property

Tests of pull-out property were performed on the container bodies 2 of Example and Comparative Example. The test of pull-out property was performed on the sample with the inner bag 4 slightly pulled out from the container body 2 by first gripping the mouth part attachment member 8 and rotating it halfway, and then twisting the inner bag 4 to reduce its diameter. In the test of pull-out property, a universal testing machine, Tensilon RTF-1325 (made by A&D Company, Limited) was used to measure the pull-out strength when the mouth part attachment member 8 was grasped and pulled out from the container body 2. The pull-out speed was 500 mm/min. For each of Examples and Comparative Example, the pull-out strength was measured in 5 samples and evaluated based on the maximum value using the following criteria.

A: 6.5 kgf or less

B: more than 6.5 kgf and 7.5 kgf or less

C: more than 7.5 kgf and 8.5 kgf or less

D: more than 8.5 kgf (3) Evaluation of Sound Generation

In the test of pull-out property, whether or not a pleasant "pop" sound was generated in pulling out the inner bag 4 was listened and evaluated in accordance with the following criteria.

A: A pleasant "pop" sound was generated with sufficient loudness.

B: A pleasant "pop" sound was generated, but its loudness was relatively small.

C: A pleasant "pop" sound was generated, but its loudness was very small.

D: No pleasant "pop" sound was generated.

TABLE 1

| | Example | | | | | Comparative Example |
|---|---|---|---|---|---|---|
| | 1 | 2 | 3 | 4 | 5 | 1 |
| With or Without Outside Air Introduction Hole | without | without | without | without | without | with |
| Diameter D6 of Bottom Part Concave Region 7a (mm) | 27.5 | 22 | 25 | 30 | 32 | 27.5 |

TABLE 1-continued

| | Example | | | | | Comparative Example |
|---|---|---|---|---|---|---|
| | 1 | 2 | 3 | 4 | 5 | 1 |
| Inclination Angle δ of Peripheral Surface 7a1 (degrees) | 43.8 | 60 | 45 | 45 | 45 | 43.8 |
| Depth D7 of Bottom Part Concave Region 7a (mm) | 6 | 6 | 5 | 8 | 8 | 6 |
| D6/D2 | 0.93 | 0.75 | 0.85 | 1.02 | 1.08 | 0.93 |
| Evaluation of Pull-out Property | A | A | A | B | C | A |
| Evaluation of Sound Generation | A | C | B | A | A | D |

5. Fifth Embodiment

The present embodiment is similar to the first embodiment, and the contents described in the first embodiment can be applied to the present embodiment as long as they do not contradict the spirit thereof. Hereinafter, the difference will be mainly described.

5-1. Configuration of Double Container 1

<Basic Configuration>

The double container 1 of the present embodiment has the container body 2 and the mouth part attachment member 8 with the shapes shown in FIGS. 21 to 24.

Figure 23:
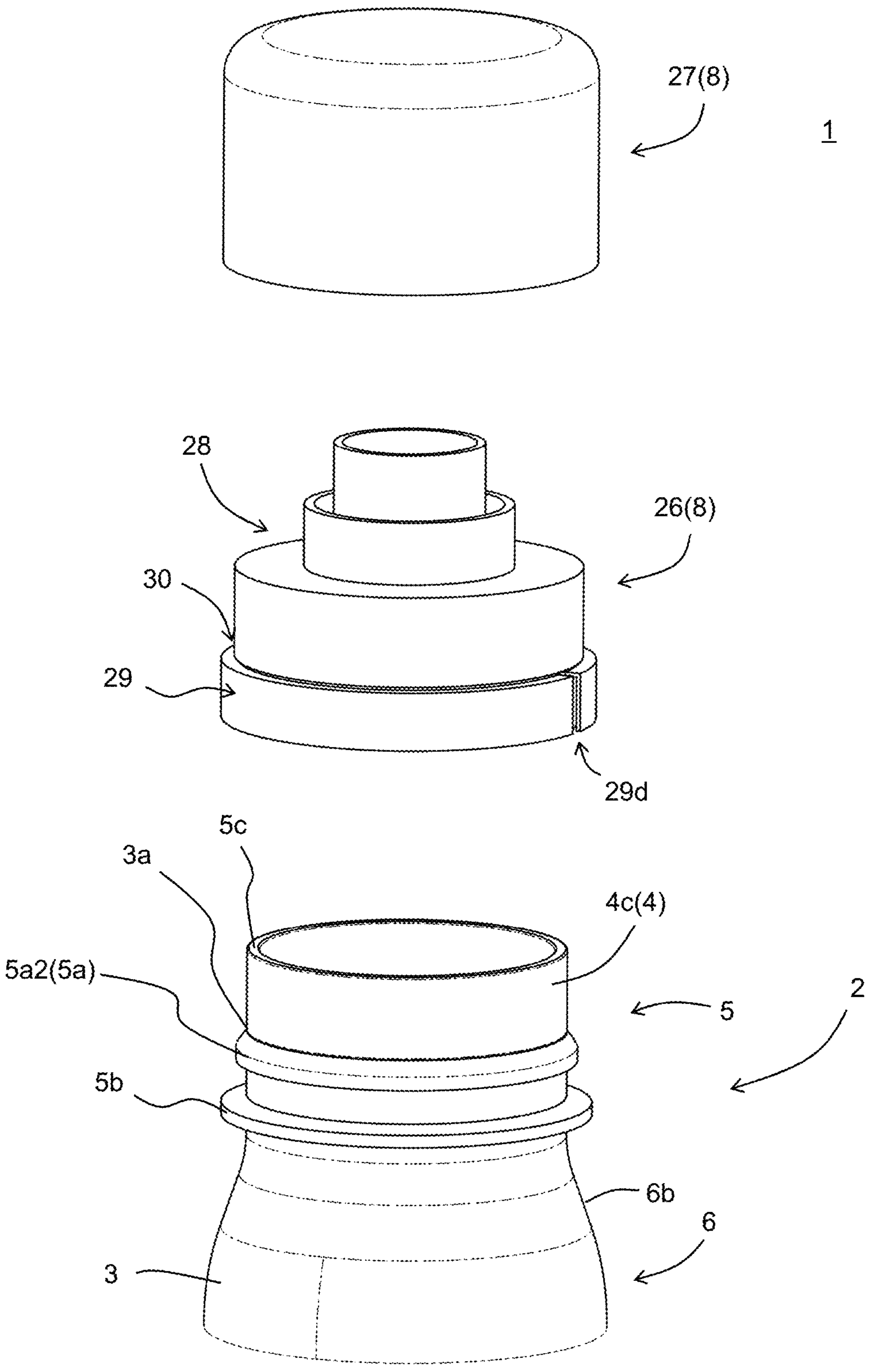
FIG. 23 is an exploded perspective view of the vicinity of the mouth part 5 of the double container 1 of FIG. 21.

As shown in FIG. 23, the inner bag 4 has the projecting part 4*c* projecting from the opening end 3*a* of the outer shell 3, and is accommodated in the outer shell 3 except for the projecting part 4*c*.

The peak torque value when the inner bag 4 is rotated 45 degrees relative to the outer shell 3 (hereinafter simply referred to as "peak torque value") is preferably 140 cN·m or less, and more preferably 100 cN·m or less. This peak torque value is an indicator of the strength of the fitting between the inner bag 4 and outer shell 3 at the mouth part 5 of the container body 2. The larger the value, the stronger the fitting between the inner bag 4 and outer shell 3, and the harder it is to pull out the inner bag 4 from the container body 2. In the container body 2 of the present embodiment, since the peak torque value is as small as 140 cN·m or less, the inner bag 4 can be easily pulled out from the container body 2. Therefore, the inner bag 4 can be grasped with a finger or a jig and pulled out from the container body 2. The peak torque value is, for example, 10 to 140 cN·m, specifically for example, 10, 20, 30, 40, 50, 60, 70, 80, 90, 100, 110, 120, 130, or 140 cN·m, and may be in the range between the two values exemplified herein, or may be equal to or less than any one of the values exemplified herein. The peak torque value is a peak torque value measured during rotation when the inner bag 4 is rotated 45 degrees clockwise (counterclockwise when viewed from above with the container body 2 upright) with the outer shell 3 fixed and the inner bag 4 grasped, with no content inside the inner bag 4. The peak torque value can be measured using a torque meter (model: 2TME500CN2, Tohnichi Mfg. Co., Ltd)

The outer diameter of the projecting part 4*c* is larger than the inner diameter at the opening end 3*a* of the outer shell 3. For this reason, the inner bag 4 is prevented from falling into the outer shell 3 when the lower surface 4*c*5 of the projecting part 4*c* abuts on the opening end 3*a*.

The projecting length of the projecting part 4*c* is, for example, 5 mm or longer, and preferably 10 mm or longer. If this projecting length is too short, it is difficult to grasp the projecting part 4*c* with a finger or a jig. This projecting length is, for example, 5 to 50 mm, specifically for example, 5, 10, 15, 20, 25, 30, 35, 40, 45, or 50 mm, and may be in the range between the two values exemplified herein, or may be equal to or longer than any one of the values exemplified herein.

The thickness of the projecting part 4*c* is, for example, 0.4 to 2 mm, specifically for example, 0.4, 0.5, 0.6, 0.7, 0.8, 0.9, 1.0, 1.1, 1.2, 1.3, 1.4, 1.5, 1.6, 1.7, 1.8, 1.9, or 2.0 mm, and may be in the range between the two values exemplified herein.

The outer surface or inner surface of the projecting part 4*c* is preferably provided with an uneven shape. By providing the uneven shape, a finger or jig is suppressed from slipping off the projecting part 4*c* when the projecting part 4*c* is grasped with the finger or jig to apply force to the projecting part 4*c*. The uneven shape may be formed by graining the outer surface or inner surface of the projecting part 4*c*, or by providing a concave part or convex part on the outer surface or inner surface of the projecting part 4*c*. The concave part or convex part can be formed in the shape of an island, groove, or lattice, for example.

Figure 24:
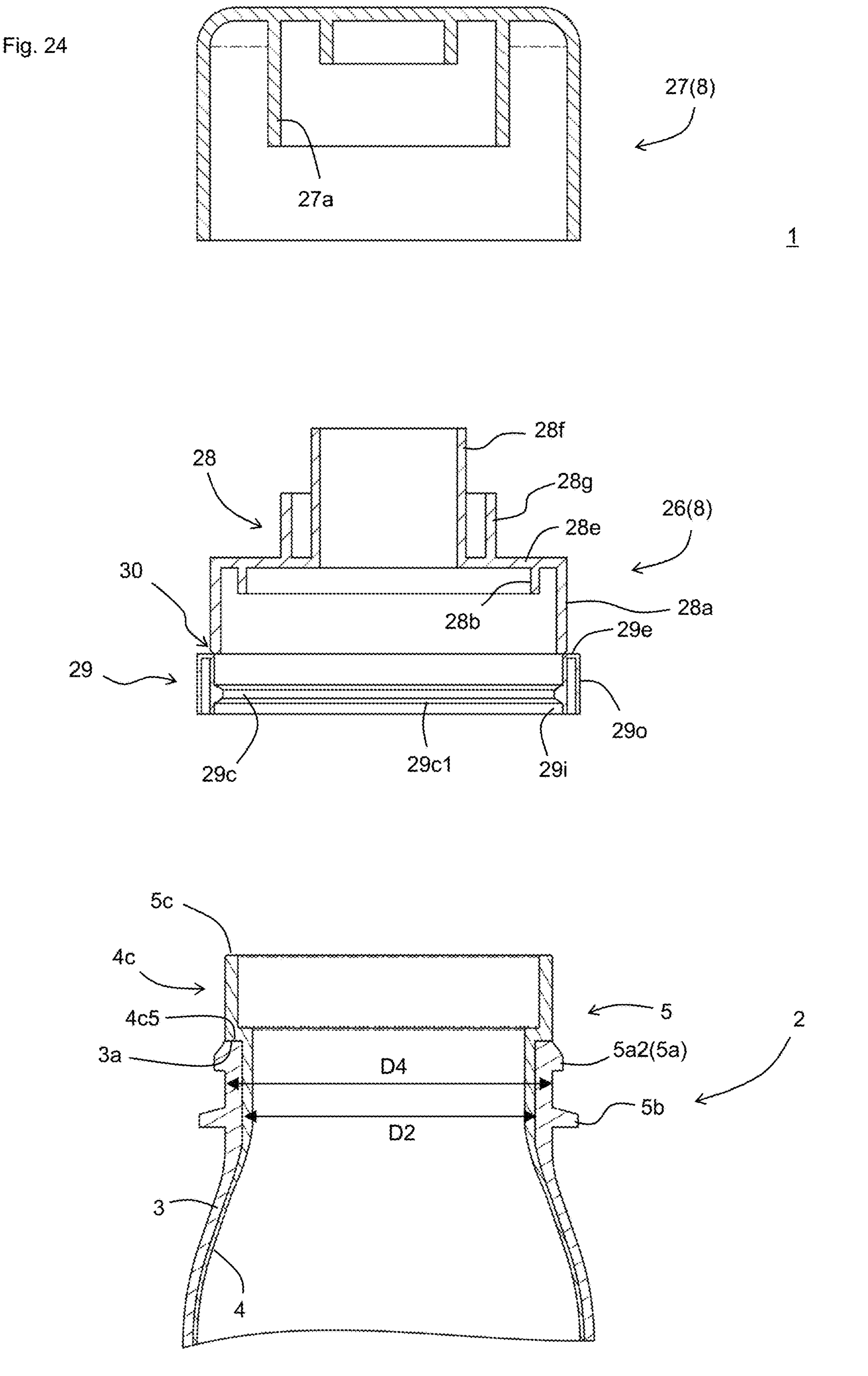
FIG. 24 is an exploded cross-sectional view of the vicinity of the mouth part 5 of the double container 1 of FIG. 21.

As shown in FIG. 24, the inner diameter D2 of the mouth part 5 of the outer shell 3 is, for example, 20 to 50 mm, and preferably 25 to 40 mm. The outer diameter D4 of the mouth part 5 of the outer shell 3 (outer diameter of the part other than the engagement part 5*a* and the flange 5*b*) is, for example, 25 to 55 mm, and preferably 30 to 45 mm. The inner diameter D2 is, specifically for example, 20, 25, 30, 35, 40, 45, or 50 mm, and the outer diameter D4 is, specifically for example, 25, 30, 35, 40, 45, 50, or 55 mm. Each of these may be in the range between the two values exemplified here.

<Engagement Structure of Mouth Part Attachment Member 8 and Container Body 2>

The mouth part attachment member 8 is configured to be attachable to the mouth part 5. The mouth part attachment member 8 is engaged with the outer shell 3 at the mouth part 5 in the axial direction, and may or may not be engaged in the circumferential direction. The mouth part attachment member 8 is not engaged with the inner bag 4 in the axial direction, and may or may not be engaged in the circumferential direction.

Hereinafter, the engagement structure of the mouth part attachment member 8 and the container body 2 will be described in more detail.

As shown in FIG. 23, the mouth part attachment member 8 has an inner cap 26 and an overcap 27. The inner cap 26 has a body part 28 and a band part 29. The body part 28 and the band part 29 are connected to each other via an easily tearable connecting part 30. The band part 29 is engaged with the mouth part 5 of the outer shell 3 in the axial direction. For this reason, the band part 29 is restricted from moving in axial direction with respect to the mouth part 5 of the outer shell 3.

The connecting part 30 is configured to be tearable by applying force (shear force, rotational force, etc.) between the body part 28 and the band part 29. The connecting part 30 is preferably thinner than the body part 28 and the band part 29.

The band part 29 has a belt shape and is arranged so as to surround the annular convex part 5*a*2. As shown in FIG. 24, an engagement convex part 29*c* extending in the circumferential direction is provided on the inner peripheral surface of the band part 29. The band part 29 is engaged with the mouth part 5 of the outer shell 3 in the axial direction by engaging the engagement convex part 29*c* with the annular convex part 5*a*2 in the axial direction. A tapered surface 29*c*1 is provided on the lower side of the engagement convex part 29*c*, and the force required for the engagement convex part 29*c* to climb over the annular convex part 5*a*2 is reduced.

The band part 29 has an outer wall 290, an inner wall 29*i*, and a connecting wall 29*e*. The outer wall 290 is arranged at a distance from the inner wall 29*i* towards the outside. The outer wall 290 and the inner wall 29*i* are connected by the connecting wall 29*e*. The engagement convex part 29*c* is provided on the inner wall 29*i*. According to such a configuration, when the engagement convex part 29*c* is pressed against the annular convex part 5*a*2, the engagement convex part 29*c* is more easily spread outwardly in the radial direction, thereby reducing the force required to attach the mouth part attachment member 8 to the mouth part 5.

As shown in FIG. 23, the band part 29 has a notched part 29*d*. By grasping one end of the band part 29 at the notched part 29*d* and pulling it radially outward, the connecting part 30 can be torn off and the band part 29 can be removed. To facilitate grasping one end of the band part 29, a knob may be provided at one end of the band part 29.

As shown in FIG. 24, the body part 28 has an outer cylinder 28*a*, an inner cylinder 28*b*, a top plate 28*e*, a discharge cylinder 28*f*, and an attachment cylinder 28*g*.

The top plate 28*e* is provided on the upper surface of the outer cylinder 28*a*. The inner cylinder 28*b* is provided on the lower surface of the top plate 28*e*. The inner cylinder 28*b* is a so-called inner ring, which is smaller in diameter than the outer cylinder 28*a* and is arranged inside the outer cylinder 28*a*. The discharge cylinder 28*f* and the attachment cylinder 28*g* are provided on the upper surface of the top plate 28*e*. The content of the inner bag 4 is discharged through the discharge cylinder 28*f*. An unshown engagement part is provided on the outer peripheral surface of the attachment cylinder 28*g*, which engages with an engagement part (not shown) provided on the inner cylinder 27*a* of the overcap 27, thereby enabling the overcap 27 to be attached to and detached from the inner cap 26. For example, the overcap 27 and inner cap 26 are screw-engaged. In this case, the overcap 27 can be attached to and detached from the inner cap 26 by rotating the overcap 27 relative to the inner cap 26.

<Method for Pulling Out Inner Bag 4>

After the content of the inner bag 4 has been used up, the inner bag 4 can be pulled out from the container body 2 by the following method.

As shown in FIGS. 21 to 24, before starting to pull out the inner bag 4, the body part 28 of the mouth part attachment member 8 and the band part 29 are connected and the band part 29 is engaged with the mouth part 5 of the outer shell 3 in the axial direction. Therefore, the inner bag 4 cannot be pulled out from the container body 2 in this state. For this reason, first, the band part 29 is removed by grasping one end of the band part 29 at the notched part 29*d* and pulling it radially outward to tear off the connecting part 30. As a result, the engagement between the mouth part attachment member 8 and the mouth part 5 of the outer shell 3 is released, allowing the mouth part attachment member 8 to be removed. The band part 29 can be separated from the body part 28 with the overcap 27 attached to the inner cap 26. The body part 28 can then be removed from the mouth part 5 with the overcap 27 attached to the body part 28. This suppresses the body part 28 and the overcap 27 from coming apart.

When the mouth part attachment member 8 is removed, the projecting part 4*c* of the inner bag 4 is exposed, and by grasping it with a finger or jig to pulling it, the inner bag 4 can be pulled out from the container body 2. The inner bag 4 can be pulled out without rotation, but it is preferable to rotate the inner bag 4 relative to the outer shell 3 before or while pulling out the inner bag 4. As a result, the inner bag 4 is twisted and reduced in diameter, making it easier to pull out the inner bag 4. If the inner bag 4 is strongly fit with the outer shell 3 at the mouth part 5, it is not easy to pull out the inner bag 4. However, since the peak torque value is small in the present embodiment, the fitting force between the inner bag 4 and the outer shell 3 at the mouth part 5 is weak and the inner bag 4 can be pulled out or rotated easily.

Incidentally, from another perspective, the present invention can be understood as a method for pulling out an inner bag, the method including an inner bag pulling-out step. In the inner bag pulling-out step, the inner bag 4 is pulled out from the container body 2 having the inner bag 4 and the outer shell 3. This pulling out is performed while twisting the inner bag 4 or after twisting the inner bag 4. By twisting the inner bag 4, the inner bag 4 can be reduced in diameter. The inner bag 4 can also be twisted by rotating the mouth part 5 of the inner bag 4 relative to the outer shell 3. The mouth part 5 of the inner bag 4 can be rotated around the central axis of the mouth part 5. Since the body part 6 or the bottom part 7 of the inner bag 4 is difficult to rotate relative to the outer shell 3 compared to the mouth part 5 of the inner bag 4, the inner bag 4 can be twisted by rotating the mouth part 5 of the inner bag 4.

Since the shoulder part 6*b* of the inner bag 4 tends to be thick and its diameter is enlarged toward the bottom part 7, the resistance force when the shoulder part 6*b* of the inner bag 4 passes through the mouth part 5 of the outer shell 3 tends to be greater. Therefore, the inner bag 4 is preferably twisted at least at the shoulder part 6*b* (i.e., wrinkles formed by the twisting of the inner bag 4 are preferably formed at the shoulder part 6*b*).

Further, the rotation angle of the mouth part 5 of the inner bag 4 with respect to the bottom part 7 of the inner bag 4 when twisting the inner bag 4 is preferably 30 degrees or more, and more preferably 90 degrees or more. This rotation angle is, for example, 30 to 1080 degrees, preferably 90 to 360 degrees, and more preferably 120 to 240 degrees. This rotation angle is, specifically for example, 30, 45, 60, 90, 120, 150, 180, 210, 240, 270, 300, 330, 360, 720, or 1080 degrees, and may be in the range between the two values exemplified herein.

For the invention in terms of the method for pulling out the inner bag 4 described above, the peak torque value of 140 cN·m or less is preferred but not mandatory.

5-2. Method for Manufacturing Double Container 1

Figure 25:
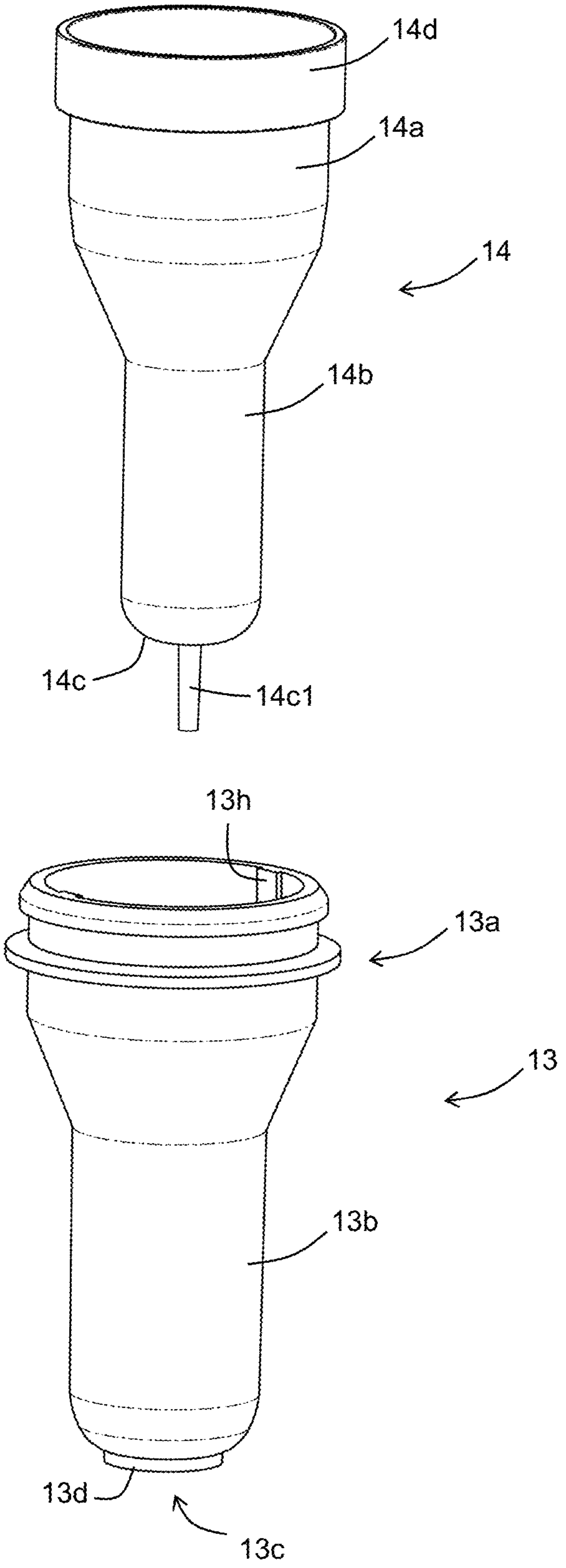
FIG. 25 is a perspective view showing a state in which the inner preform 14 and the outer preform 13 are separated.
Figure 26:
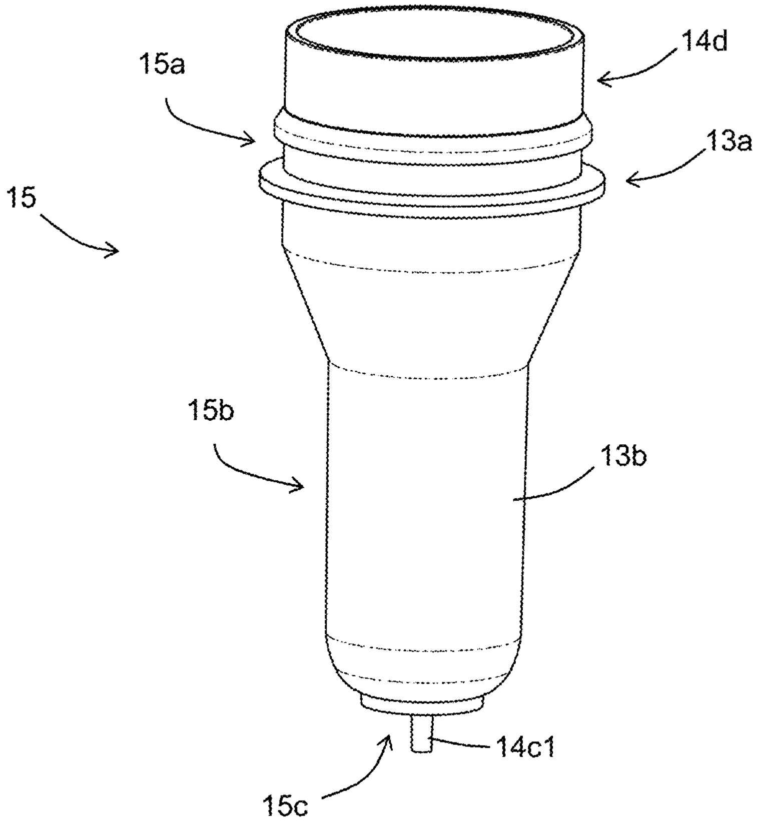
FIG. 26 is a perspective view of the preform 15 configured by covering the inner preform 14 with the outer preform 13.

As shown in FIGS. 25 to 26, the container body 2 can be formed by heating the preform 15 and performing biaxial stretch blow molding.

<Configuration of Inner Preform 14, Outer Preform 13, and Preform 15>

The inner surface of the mouth part 13*a* of the outer preform 13 is preferably provided with a projection 13*h* projecting inwardly in the radial direction. The projections 13*h* are preferably provided at a plurality of locations (e.g., two locations) at equal intervals in the circumferential direction. The width (circumferential length) of each projection 13*h* is, for example, 1 to 10 mm, specifically for example, 1, 2, 3, 4, 5, 6, 7, 8, 9, or 10 mm, and may be in the range between the two values exemplified herein. The projections 3*h* remain in substantially the same shape even after biaxial stretch blow molding. Therefore, by providing the projections 3*h*, the peak torque value of the inner bag 4 relative to the outer shell 3 can be suppressed while making it possible to position the inner preform 14 and the outer preform 13 concentrically.

The peak torque value can be reduced (e.g., to 140 cN·m or less) by setting the outer diameter of mouth part 14*a* and the inner diameter of mouth part 13*a* such that the outer diameter of mouth part 14*a* is smaller than the inner diameter of mouth part 13*a* (the inner diameter at a part other than the projections 13*h* when the projections 13*h* are provided). The difference between the inner diameter of the mouth part 13*a* and the outer diameter of the mouth part 14*a* at the part other than the projections 13*h* is preferably 0.3 mm or more, and more preferably 0.5 mm or more. This difference is, for example, 0.2 to 3 mm, specifically for example, 0.2, 0.3, 0.4, 0.5, 0.6, 0.7, 0.8, 0.9, 1.0, 1.1, 1.2, 1.3, 1.4, 1.5, 2.0, 2.5, or 3.0 mm, and may be in the range between the two values exemplified herein, or may be equal to or more than any one of the values exemplified herein. The difference between the inner diameter of the mouth part 13*a* and the outer diameter of the mouth part 14*a* at the projection 13*h* is preferably 0.05 to 0.20 mm, for example. This difference is, specifically for example, 0.05, 0.10, 0.15, or 0.20 mm, and may be in the range between the two values exemplified herein.

5-3. Modifications

The projecting length of the projecting part 4*c* may be shorter than that in the above-described embodiment, or the projecting part 4*c* may be omitted such that the inner bag 4 does not project from the outer shell 3. Even in this case, the inner bag 4 can be pulled out from the container body 2 by friction between the inner surface of the inner bag 4 and a finger, for example. To increase this frictional force as much as possible, the inner surface of the inner bag 4 is preferably provided with an uneven shape.

6. Sixth Embodiment

Figure 27A:
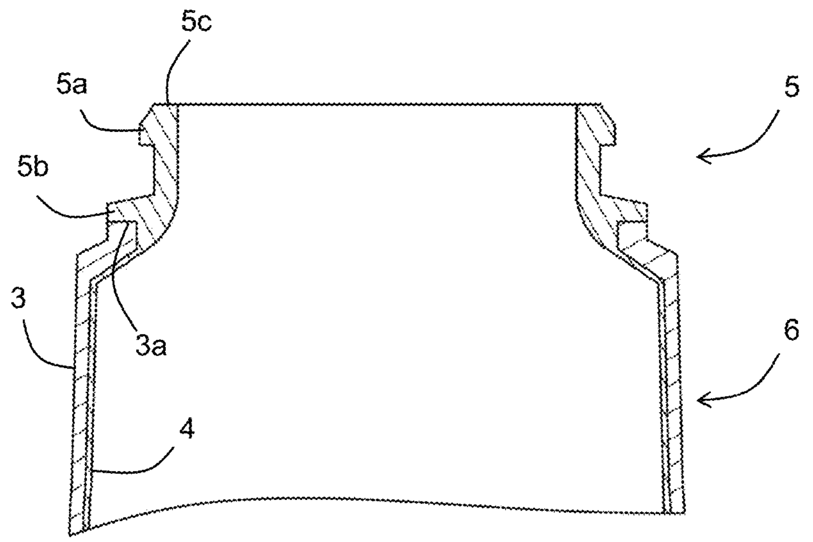
FIG. 27A is a cross-sectional view of the vicinity of the mouth part 5 of the container body 2 of the sixth embodiment of the present invention.
Figure 27B:
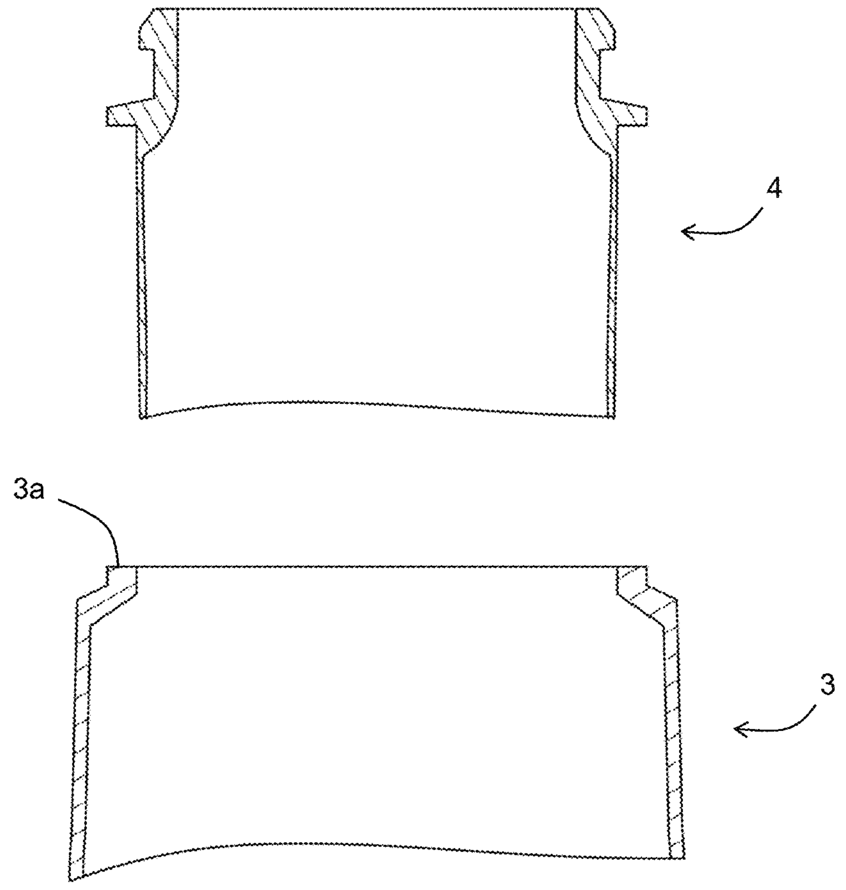
FIG. 27B is a cross-sectional view showing a state after the inner bag 4 is pulled out and the inner bag 4 and the outer shell 3 are separated from the state of FIG. 27A.

FIGS. 27A to 27B are used to describe the sixth embodiment of the present invention. The description in the fifth embodiment can be applied to the present embodiment as long as it does not contradict the spirit thereof.

As shown in FIG. 27A, for the container body 2 of the present embodiment, the engagement part 5*a* to which the mouth part attachment member 8 can be attached is provided at the mouth part 5 of the inner bag 4. The outer shell 3 is arranged to cover the body part 6 and the bottom part 7 of the inner bag 4. Even if the container body 2 has such a configuration, the inner bag 4 can be easily pulled out from the container body 2 as shown in FIG. 27B by setting the peak torque value when the inner bag 4 is rotated 45 degrees relative to the outer shell 3 to 140 cN·m or less.

Further, in the container body 2 of the present embodiment, the inner bag 4 is provided with the flange 5*b* at a position farther from the opening end 5*c* of the inner bag 4 than the engaging part 5*a*. In other words, the flange 5*b* is provided on the inner bag 4. The opening end 3*a* of the outer shell 3 is arranged farther from the opening end 5*c* than the flange 5*b*. The opening end 3*a* of the outer shell 3 is preferably in close contact with the lower surface of the flange 5*b*.

According to such a configuration, it is easy to increase the inner diameter of the outer shell 3 at the part where the inner diameter is minimum, and the inner bag 4 can be easily pulled out. The inner bag 4 may be pulled out while twisting or without twisting. For example, in the case where the double container 1 is configured such that the inner bag 4 shrinks as the content in the inner bag 4 decreases (e.g., the case where a check valve in the mouth part attachment member 8 prevents outside air from entering the inner bag 4, and an outside air introduction part is provided between the inner bag 4 and the outer shell 3), the inner bag 4 is in a shrunk state when the content in the inner bag 4 is used up, making the inner bag 4 easily pulled out without twisting.

Incidentally, from another perspective, the present invention can be understood as a method for pulling out an inner bag, the method including an inner bag pulling-out step. In the inner bag pulling-out step, in the container body 2 with the above-described configuration, the inner bag 4 is pulled out from the container body 2 having the inner bag 4 and the outer shell 3. By increasing the inner diameter of the outer shell 3 at the part where the inner diameter is minimum, the inner bag 4 can be easily pulled out. From this perspective, the above-described peak torque value of 140 cN·m or less is preferable but not mandatory.

Further, the container body 2 of the present embodiment may be manufactured using the preform 15 with the configuration described in the fifth embodiment, or using the multi-layer preform 15 formed by co-injection molding or two-color molding the layers configuring the inner preform 14 and the outer preform 13.

Example of Third Embodiment

(1) Method for Manufacturing Container Body 2

Example 1

According to the method described above, the container body 2 (capacity: 300 mL) shown in FIGS. 21 to 24 was manufactured by performing biaxial stretch blow molding of the preform 15 as shown in FIGS. 25 to 26. The inner preform 14 was manufactured by injection molding homopolypropylene (model: Novatech, made by Japan Polypropylene Corporation). The outer preform 13 was manufactured by injection molding PET (model: titanium-based catalyst grade, made by Teijin Limited) at 300° C. into the shape of the outer preform and then rapidly cooling it to 20° C. The rapid cooling turned the PET in a molten state into an amorphous state. The outer diameter of the mouth part 14*a* of the inner preform 14 was 34.0 mm, and the inner diameter of the mouth part 13*a* of the outer preform 13 was 34.1 mm at the projections 13*h* with a width of 4 mm, which were provided at two locations at 180 degrees interval on the inner surface of the mouth part 13*a*, and was 35.5 mm at the other parts.

After heating such a preform 15 to 110° C. (temperature at the center of the preform 15 in the longitudinal direction), the container body 2 was obtained by biaxial stretch blow molding.

Comparative Example 1

The container body 2 was obtained in the same manner as in Example 1, except that the outer diameter of the mouth part 14*a* of the inner preform 14 was 25.9 mm, and the inner diameter of the mouth part 13*a* of the outer preform 13 was 26.0 mm without the projections 13*h* on the outer preform 13.

(2) Torque Measurement

Using a torque meter (model: 2TME500CN2, made by Tohnichi Mfg. Co., Ltd), the torque measured during rotation was measured when the inner bag 4 was rotated 45 degrees clockwise in the state that the outer shell 3 was fixed and the projecting part 4*c* of the inner bag 4 was grasped, with no content inside the inner bag 4. The peak value was used as the torque peak value.

Torque peak values were measured in five samples for each of Example 1 and Comparative Example 1, and the average values were calculated to be 52.4 cN·m for Example 1 and 221.9 cN·m for Comparative Example 1.

(3) Test of Pull-Out Property

Tests of pull-out property were performed on the container bodies 2 of Example 1 and Comparative Example 1. In the test of pull-out property, the pull-out strength when the projecting part 4*c* of the inner bag 4 was grasped and pulled out from the container body 2 was measured using a universal testing machine, Tensilon RTF-1325 (made by A&D Company, Limited). The pull-out strength was measured in five samples for each of Example 1 and Comparative Example 1, and the average values were calculated to be 6.1 kgf for Example 1 and 13.2 kgf for Comparative Example 1.

7. Seventh Embodiment

The present embodiment is similar to the first embodiment, and the contents described in the first embodiment can be applied to the present embodiment as long as they do not contradict the spirit thereof. Hereinafter, the differences will be mainly described.

7-1. Configuration of Double Container 1

<Basic Configuration>

As shown in FIGS. 1 to 7, the double container 1 of one embodiment of the present invention has the container body 2 and the mouth part attachment member 8.

The mouth part attachment member 8 may or may not have a check valve (not shown). If the mouth part attachment member 8 does not have a check valve, it is not easy to pull out the inner bag 4 through the mouth part 5 of the outer shell 3 because the inner bag 4 does not shrink even after the content of the inner bag 4 is discharged. Since the present invention facilitates pulling out the inner bag 4 through the mouth part 5 of the outer shell 3, the significance of applying the present invention is particularly prominent when the mouth part attachment member 8 is not provided with a check valve. Further, the container body 2 may or may not be provided with an outside air introduction part that introduces outside air into the intermediate space between the inner bag 4 and the outer shell 3. Examples of the outside air introduction part include the outside air introduction hole formed by perforating the outer shell 3, and the part where the interface between the outer shell 3 and the inner bag 4 is peeled off at the bottom part or mouth part of the container body 2 to allow the introduction of the outside air. In the double container 1 of the present embodiment, since it is not necessary to shrink the inner bag 4, it is not mandatory to provide the outside air introduction part.

<Material and Layer Configuration>

The inner bag 4 is configured to be pulled out from the container body 2, and the inner bag 4 can be separated from the outer shell 3 by pulling out the inner bag 4 from the container body 2 after the content in the inner bag 4 is used up. The peak torque value when the inner bag 4 is rotated 45 degrees relative to the outer shell 3 (hereinafter simply referred to as "peak torque value") is preferably 200 cN·m or less, more preferably 140 cN·m or less, and even more preferably 100 cN·m or less. The peak torque value is an indicator of the strength of the fitting between the inner bag 4 and the outer shell 3 at the mouth part 5 of the container body 2. The larger the value, the stronger the fitting between the inner bag 4 and the outer shell 3, and the harder it is to pull out the inner bag 4 from the container body 2. In the container body 2 of the present embodiment, the peak torque value is as small as 200 cN·m or less, which makes it easy to pull out the inner bag 4 from the container body 2. This peak torque value is, for example, 10 to 200 cN·m, specifically for example, 10, 20, 30, 40, 50, 60, 70, 80, 90, 100, 110, 120, 130, 140, 150, 160, 170, 180, 190, or 200 cN·m, and may be in the range between the two values exemplified herein, or may be equal to or less than any one of the values exemplified herein. The peak torque value is a peak torque value measured during rotation when the inner bag 4 is rotated 45 degrees clockwise (counterclockwise when viewed from above with the container body 2 upright) with the outer shell 3 fixed and the inner bag 4 grasped, with no content inside the inner bag 4. The peak torque value can be measured using a torque meter (model: 2TME500CN2, Tohnichi Mfg. Co., Ltd).

The innermost layer of the inner bag 4 is configured of a water-absorbent softening resin that has the property of softening by water absorption. Therefore, by wetting the innermost layer of the inner bag 4 before pulling out the inner bag 4 from the container body 2, the force required to pull out the inner bag 4 from the container body can be reduced.

The water-absorbent softening resin means a resin in which the rate of decrease in flexural modulus due to water absorption is 10% or higher. This rate of decrease is, for example, 10 to 80%, specifically for example, 10, 15, 20, 25, 30, 35, 40, 45, 50, 60, 70, or 80%, and may be in the range between the two values exemplified herein, or may be equal to or higher than any one of the values exemplified herein.

The rate of decrease in flexural modulus due to water absorption can be determined by the following procedure. The flexural modulus can be measured at 25° C. in accordance with JIS K7171.

First, a test piece of 80 mm×10 mm×4 mm is made by injection molding using the resin to be tested, and the flexural modulus is measured. The measured value is taken as P1.

Next, the test piece is immersed in water for 96 h to absorb water, and then the flexural modulus is measured. The measured value is taken as P2.

The rate of decrease in flexural modulus due to water absorption is calculated based on the following formula (1).

$$\text{Rate of Decrease in Flexural Modulus due to Water Absorption (\%)} = 100\times(P1-P2)/P1 \tag{1}$$

The flexural modulus of the water-absorbent softening resin before water absorption is preferably 1000 $N/mm^2$ or higher, and more preferably 2000 $N/mm^2$ or higher. When the flexural modulus of the water-absorbent softening resin before water absorption has such a high value, the technical significance of applying the present invention to reduce the pull-out force of the inner bag 4 is prominent. This flexural modulus is, for example, 1000 to 10000 N/mm$^2$, specifically for example, 1000, 1500, 2000, 2500, 3000, 3500, 4000, 4500, 5000, 6000, 7000, 8000, 9000, or 10000 N/mm$^2$, and may be in the range between the two values exemplified herein, or may be equal to or higher than any one of the values exemplified herein.

Here, the flexural modulus and the rate of decrease thereof for several resins were measured using the method described above, and the results are shown in Table 2. As shown in Table 2, EVOH and nylon are water-absorbent softening resins because the rate of decrease in flexural modulus due to water absorption is 10% or more, while polypropylene and PET are not water-absorbent softening resins because the rate of decrease is less than 10%.

TABLE 2

| No. | Resin | Flexural Modulus [N/mm$^2$] Before Water Absorption P1 | Flexural Modulus [N/mm$^2$] After Water Absorption P2 | Rate of Decrease in Flexural Modulus |
|---|---|---|---|---|
| 1 | Nylon | 3922 | 3057 | 22.0% |
| 2 | Polyethylene | 616 | 611 | 0.8% |
| 3 | EVOH (Ethylene Content: 40 mol %) | 3574 | 2178 | 39.0% |
| 4 | PET | 2534 | 2451 | 3.3% |

The inner bag 4 preferably has a flexural rigidity per unit width of 100 mN·mm or less. The flexural rigidity is a parameter that serves as an indicator of flexibility, and if the flexural rigidity is too large, it may be hard to pull out the inner bag 4 from the container body 2. The flexural rigidity per unit width of the inner bag 4 is preferably 10 mN·mm or higher. To reduce the flexural rigidity, it is necessary to reduce the thickness of the inner bag 4. This is because a pinhole is more likely to be generated in the inner bag 4 if the thickness of the inner bag 4 is reduced. The flexural rigidity per unit width of the inner bag 4 is, specifically for example, 10, 15, 20, 23, 25, 30, 35, 40, 45, 50, 51, 55, 60, 65, 70, 75, 80, 85, 90, 95, or 100 mN·mm, and may be in the range between the two values exemplified herein, or may be equal to or lower than any one of the values exemplified herein.

The flexural rigidity can be calculated based on the following formulas (2) to (3).

$$\text{Flexural Rigidity } [N\cdot\text{mm}^2] = \text{Flexural Modulus } E[N/\text{mm}^2] \times \text{Cross-sectional Secondary Moment } I\ [\text{mm}^4] \quad (2)$$

$$\text{Cross-sectional Secondary Moment } I\ [\text{mm}^4] = \text{Width } b[\text{mm}] \times (\text{Thickness } h)[\text{mm}^3]/12 \quad (3)$$

The flexural rigidity per unit width is defined by the following formula (4) and can be calculated based on the formula (5) by referring to the formulas (2) to (3).

$$\text{Flexural Rigidity per Unit Width } [N\cdot\text{mm}] = \text{Flexural Rigidity } [N\cdot\text{mm}^2]/\text{Width } b[\text{mm}] \quad (4)$$

-continued $$\text{Flexural Rigidity per Unit Width } [N\cdot\text{mm}] = \text{Flexural Modulus } E[N/\text{mm}^2] \times (\text{Thickness } h)^3[\text{mm}]^3/12 \quad (5)$$

When the resin configuring the inner bag 4 is polypropylene and the thickness of the inner bag 4 is 0.1 mm, the flexural rigidity per unit width is 51 mN·mm. Therefore, when the flexural rigidity per unit width is within the above numerical range, the inner bag 4 has flexibility that is almost comparable to that when the inner bag 4 is made of polypropylene. If the resin configuring the inner bag 4 is EVOH as described above and the thickness of the inner bag 4 is 0.05 mm, the flexural rigidity per unit width is 23 mN·mm.

Examples of the water-absorbent softening resin include EVOH (ethylene-vinyl alcohol copolymer), nylon, and paper-mixed plastics. The water-absorbent softening resin is preferably an EVOH-based resin containing 50 mass % or higher of EVOH. The EVOH-based resin may contain only EVOH or may be a mixed resin of EVOH and other resins. Examples of other resins include nylon and olefin-based resins. The olefin-based resin is a resin in which the content of the olefin unit is 50 mass % or higher. Examples of the olefin-based resin include ethylene and propylene. The ratio of olefin unit contained in the olefin-based resin is, for example, 50 to 100 mass %, specifically for example, 50, 60, 70, 80, 90, or 100 mass %, and may be in the range between the two values exemplified herein, or may be equal to or higher than any one of the values exemplified herein. Examples of the olefin-based resin include low-density polyethylene, linear low-density polyethylene, high-density polyethylene, polypropylene, and copolymers (random copolymer or block copolymer) of propylene and other olefins (ethylene etc.). The ratio of EVOH in the EVOH-based resin is, for example, 50 to 100 mass %, specifically for example, 50, 60, 70, 80, 90, or 100 mass %, and may be in the range between the two values exemplified herein, or may be equal to or higher than any one of the values exemplified herein.

The ethylene content of EVOH is preferably 25 to 46 mol %. If the ethylene content of EVOH is too low, the flexibility of the inner bag 4 decreases significantly, and the pull-out property of the inner bag 4 is likely to deteriorate noticeably. Further, if the ethylene content of EVOH is too low, the inner bag 4 may be too brittle and cracking may occur in the projecting part 4*c* when the mouth part attachment member 8 is engaged with the projecting part 4*c* of the inner bag 4, as shown in FIG. 1. On the other hand, if the ethylene content of EVOH is too high, the improvement of the gas barrier property of the inner bag 4 is likely to be insufficient. By making the ethylene content within the above range, the occurrence of the above problems can be suppressed. The ethylene content is, specifically for example, 25, 26, 27, 28, 29, 30, 31, 32, 33, 34, 35, 36, 37, 38, 39, 40, 41, 42, 43, 44, 45, or 46 mol %, and may be in the range between the two values exemplified herein.

The inner bag 4 may have a single-layer configuration or multi-layer configuration. When the inner bag 4 has a single-layer configuration, the entire inner bag 4 becomes the innermost layer. When the inner bag 4 has a single-layer configuration, the inner preform 14 (shown in FIG. 9) for forming the inner bag 4 can also have a single-layer configuration. Since the inner preform 14 with a single-layer configuration can be formed by general injection molding, the manufacturing cost can be lowered. If the inner bag 4 has a multi-layer configuration, it is provided with another layer outside the innermost layer configured of the water-absorbent softening resin. Example of another layer include an olefin-based resin layer configured of an olefin-based resin. The description of the olefin-based resin is as described above.

The thickness of the inner bag 4 at the center of the container body 2 in the height direction is, for example, 0.05 to 0.25 mm, and preferably 0.08 to 0.20 mm. This thickness is, specifically for example, 0.05, 0.06, 0.07, 0.08, 0.09, 0.10, 0.15, 0.20, or 0.25 mm, and may be in the range between the two values exemplified herein. The ratio of the thickness of the innermost layer to the thickness of the entire inner bag 4 is preferably 30% or higher. The higher this value, the more prominent the softening effect of the inner bag 4 due to water absorption of the innermost layer. This ratio is, for example, 30 to 100%, specifically for example, 30, 35, 40, 45, 50, 55, 60, 65, 70, 75, 80, 85, 90, 95, or 100%, and may be in the range between the two values exemplified herein.

The material and layer configuration of the outer shell 3 is not particularly limited. The outer shell 3 can be formed of a thermoplastic resin such as polyester (e.g., PET) or polyolefin (e.g., polypropylene, polyethylene), from and the viewpoint of recyclability, it is preferably formed of PET. From the viewpoint of reducing environmental load, the outer shell 3 is preferably formed of a biomass plastic.

<Structure of Mouth Part Attachment Member 8 and Engagement Structure Between Mouth Part Attachment Member 8 and Container Body 2>

The mouth part attachment member 8 is attached to the mouth part 5 of the container body 2. As shown in FIG. 2, the mouth part attachment member 8 is a cap, for example, which has an inner cap 26 and an overcap 27. The overcap 27 can be omitted. The inner cap 26 is engaged with the inner bag 4 in the axial direction, and may or may not be engaged in the circumferential direction. The overcap 27 is engaged with the inner cap 26. This engagement may be a screw engagement or a snap engagement.

Incidentally, the double container 1 is preferably an inverted container having a cap with an enlarged top surface diameter. In this case, the top surface of the double container 1 can be installed in an inverted state to enable stable placement of the double container 1. In the present embodiment, the overcap 27 has an enlarged diameter part 27*e* provided to include the top surface 27*d* of the overcap 27 to enable stable placement of the double container 1 in the inverted state. In the inverted state, the top surface 27*d* is the ground surface, and the area of the top surface 27*d* is increased by providing the enlarged diameter part 27*e*, thereby improving the placement stability of the double container 1 in the inverted state.

Incidentally, when the double container 1 is placed in an inverted state, the content can easily come into contact with the shoulder part 6*b* even after the amount of content has been reduced. Since water is contained the content, the water-absorbent softening resin configuring the innermost layer of the inner bag 4 can be softened by bringing the content into contact with the shoulder part 6*b*. Since the resistance force tends to increase when the shoulder part 6*b* passes through the mouth part 5 when pulling out the inner bag 4 from the container body 2, the force required to pull out the inner bag 4 from the container body 2 is particularly reduced by softening the shoulder part 6*b* of the inner bag 4.

<Method for Pulling Out Inner Bag 4>

First, the innermost layer of the inner bag 4 is wetted and softened before starting to pull out the inner bag 4. The innermost layer of the inner bag 4 may be wetted with water from the content, or the innermost layer of the inner bag 4 may be wetted with water supplied from outside after the content has been used up. Further, if the double container 1 is an inverted container, the content is in contact with the shoulder part 6*b* until just before the content is used up. Therefore, the shoulder part 6*b* is wet without any work after the content is used up. In addition, even if the double container 1 is not an inverted container, the shoulder part 6*b* can be made wet with the content by inverting the double container 1 before using up the content.

Subsequent operations are the same as those in the first embodiment. In the example of the above embodiment, the inner bag 4 is pulled out using the mouth part attachment member 8, but the inner bag 4 may be pulled out by grasping it with the hand or by other methods. In either case, the force required to pull out the inner bag 4 is reduced because the innermost layer of the inner bag 4 has been softened by water absorption.

7-2. Method for Manufacturing Double Container 1

The container body 2 can be formed by blow molding a parison. The blow molding may be direct blow molding or biaxial stretch blow molding (in other words, injection blow molding). In direct blow molding, the container body 2 is manufactured by sandwiching a molten tubular (preferably cylindrical) parison extruded from an extruder between a pair of split molds and blowing air inside the parison. In biaxial stretch blow molding, a test tube-shaped parison with a bottom called a preform is formed by injection molding, and blow molding is performed using this parison. The container body 2 can be formed by biaxial stretch blow molding because the inner bag 4 is not easily adhered to the outer shell 3 and the inner bag 4 can be easily pulled out. The method for manufacturing the container body 2 by biaxial stretch blow molding is as described in the first embodiment.

<Material and Manufacturing Method of Inner Preform 14 and Outer Preform 13>

The inner preform 14 can be formed of the material described above for the inner bag 4. The inner preform 14 can be formed by direct blow molding, injection molding or the like, but from the viewpoint of manufacturing cost and the like, it is preferably formed by injection molding. The inner bag 4 with multi-layer configuration can be formed using the inner preform 14 with multi-layer configuration. The inner preform 14 with multi-layer configuration can be formed by two-color molding or co-injection molding.

The outer preform 13 can be formed of the material described above for the outer shell 3. The outer preform 13 can be formed by direct blow molding, injection molding or the like. From the viewpoint of manufacturing cost and the like, it is preferably formed by injection molding.

The preform 15 may be formed by forming the inner preform 14 and the outer preform 13 separately and then combining them, or by two-color molding.

Modification of Seventh Embodiment

In the above-described embodiment, the method for pulling out the inner bag 4 was described taking as an example the case where the mouth part attachment member 8 was a press-fit type, but the mouth part attachment member 8 may also be a screw type. When the mouth part attachment member 8 is a screw type, if the mouth part attachment member 8 is engaged with the inner bag 4 in the circumferential and axial directions, when the mouth part attachment member 8 is rotated to release the screw engagement between the mouth part attachment member 8 and the mouth part 5, the inner bag 4 can be pushed up from the container body 2 as the mouth part attachment member 8 moves in the axial direction. In this case, there is no need to provide a mechanism such as a cam mechanism 31 between the outer shell 3 and the inner bag 4.

REFERENCE SIGNS LIST

1: double container, 2: container body, 2a: ground surface, 3: outer shell, 3a: opening end, 3b: annular convex part, 3h: projection, 3j: hollow projection, 3j1: concave part, 3k: projection, 3l: cam rail, 3m: engagement concave part, 4: inner bag, 4c: projecting part, 4c1: projecting cylinder, 4c2: engagement convex part, 4c3: tapered surface, 4c4: abutting flange, 4c5: lower surface, 4e: projection, 4g: cam convex part, 4h: engagement convex part, 4i: internally bending part, 5: mouth part, 5a: engaging part, 5a2: annular convex part, 5b: flange, 5c: opening end, 5d: root, 6: body part, 6b: shoulder part, 6b1: lower end, 6c: body part body, 6cl: part, 6c2: part, 6c3: part, 7: bottom part, 7a: bottom part concave region, 7al: peripheral surface, 7a2: bottom surface, 7b: peripheral edge region, 8: mouth part attachment member, 8a: cap, 13: outer preform, 13a: mouth part, 13b: body part, 13c: bottom 13d: part, annular convex part, 13h: projection, 13i: hollow projection, 131: cam rail, 13m: engagement concave part, 14: inner preform, 14a: mouth part, 14b: body part, 14c: bottom part, 14cl: positioning pin, 14d: projecting part, 14g: cam convex part, 14h: convex part, 15: preform, 15a: mouth part, 15b: body part, 15c: bottom part, 20: annular groove rib, 21: annular groove rib, 26: inner cap, 27: overcap, 27a: inner cylinder, 27b: hooking part, 27b1: projecting part, uneven shape, 27c: cylinder part, 27d: top surface, 27e: enlarged diameter part, 28: body part, 28a: outer cylinder, 28b: inner cylinder, 28c: annular convex part, convex 28d: engagement part, 28e: top plate, 28f: discharge cylinder, 28g: attachment cylinder, 28g1: male screw part, 29: band part, 29a: outer cylinder, 29al: thin part, 29b: inner cylinder, 29c: engagement convex part, 29c1: tapered surface, 29d: notched part, 29e: connecting wall, 29i: inner wall, 290: outer wall, 30: connecting part, 31: cam mechanism

The invention claimed is:

1. A method for pulling out an inner bag from a container body having the inner bag and an outer shell arranged to cover the inner bag, wherein the inner bag comprises an inner mouth part, an inner body part, and an inner bottom part;

the outer shell comprises an outer mouth part, an outer body part, and an outer bottom part;

the inner mouth part is a tubular part having an opening end;

the inner body part is arranged adjacent to the inner mouth part on a side farther from the opening end than the inner mouth part;

the inner body part has a larger outer diameter than the inner mouth part;

the inner bottom part is configured to close a lower end of the inner body part;

the outer mouth part is a tubular part having an opening end;

the outer body part is arranged adjacent to the outer mouth part on a side farther from the opening end than the outer mouth part;

the outer body part has a larger outer diameter than the outer mouth part;

the outer bottom part is configured to close a lower end of the outer body part; and the method comprising:

twisting the inner bag by rotating the inner mouth part relative to the outer shell around a central axis of the outer mouth part; and pulling out the inner bag from the container body while twisting the inner bag or after twisting the inner bag, wherein the inner body part has an inner shoulder part whose outer diameter increases as a distance from the inner mouth part increases; and the inner bag is twisted at least at the inner shoulder part.

2. The method of claim 1, wherein the inner bag is twisted such that a rotation angle of the inner mouth part with respect to the inner bottom part reaches 90 degrees or more by the time the pulling out is completed.

3. The method of claim 1, wherein the container body is a biaxially stretch blow molded body formed by performing biaxial stretch blow molding on a preform configured by covering an inner preform becoming the inner bag with an outer preform becoming the outer shell.

4. The method of claim 1, wherein the inner bag is twisted such that a rotation angle of the inner mouth part with respect to the inner bottom part reaches 150 degrees or more by the time the pulling out is completed.

5. A method for pulling out an inner bag from a container body having the inner bag and an outer shell arranged to cover the inner bag, wherein the inner bag comprises an inner mouth part, an inner body part, and an inner bottom part;

the outer shell comprises an outer mouth part, an outer body part, and an outer bottom part;

the inner mouth part is a tubular part having an opening end;

the inner body part is arranged adjacent to the inner mouth part on a side farther from the opening end than the inner mouth part;

the inner body part has a larger outer diameter than the inner mouth part;

the inner bottom part is configured to close a lower end of the inner body part;

the outer mouth part is a tubular part having an opening end;

the outer body part is arranged adjacent to the outer mouth part on a side farther from the opening end than the outer mouth part;

the outer body part has a larger outer diameter than the outer mouth part;

the outer bottom part is configured to close a lower end of the outer body part; and the method comprises:

removing a mouth part attachment member attached to the outer mouth part therefrom, wherein the mouth part attachment member comprises an inner cap;

the inner cap comprises a cap body part and a band part;

the cap body part and the band part are connected to each other via a tearable connecting part;

the cap body part comprises a discharge port;

the band part is engaged with the outer mouth part in an axial direction; and the band part is configured to be separable from the cap body part by tearing the connecting part;

releasing an engagement between the mouth part attachment member and the outer mouth part by tearing the connecting part to separate the band part from the cap body part, and removing the mouth part attachment member from the outer mouth part;

twisting the inner bag by rotating the inner mouth part relative to the outer shell; and pulling out the inner bag from the container body while twisting the inner bag or after twisting the inner bag.

6. The method of claim 5, wherein the container body is a biaxially stretch blow molded body formed by performing biaxial stretch blow molding on a preform configured by covering an inner preform becoming the inner bag with an outer preform becoming the outer shell.

7. The method of claim 5, wherein the inner bag is twisted around a central axis of the outer mouth part.

8. The method of claim 7, wherein the inner bag is twisted such that a rotation angle of the inner mouth part with respect to the inner bottom part reaches 90 degrees or more by the time the pulling out is completed.

9. The method of claim 7, wherein the inner bag is twisted such that a rotation angle of the inner mouth part with respect to the inner bottom part reaches 150 degrees or more by the time the pulling out is completed.

* * * * *